(12) United States Patent
Chuang et al.

(10) Patent No.: US 7,599,181 B2
(45) Date of Patent: Oct. 6, 2009

(54) PORTABLE ELECTRONIC DEVICE

(75) Inventors: I-Chen Chuang, Taoyuan (TW); San-Chi Ho, Taoyuan (TW); Ko-Min Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 171 days.

(21) Appl. No.: 11/653,840

(22) Filed: Jan. 17, 2007

(65) Prior Publication Data

US 2007/0183123 A1    Aug. 9, 2007

(30) Foreign Application Priority Data

Jan. 23, 2006 (TW) ............... 95102441 A
Jan. 23, 2006 (TW) ............... 95102444 A
Jan. 23, 2006 (TW) ............... 95102445 A

(51) Int. Cl.
*G06F 1/16* (2006.01)

(52) U.S. Cl. .................. 361/679.55; 361/679.02

(58) Field of Classification Search .................. 361/683
See application file for complete search history.

(56) References Cited

U.S. PATENT DOCUMENTS

| | | | | |
|---|---|---|---|---|
| 5,103,376 A | * | 4/1992 | Blonder | 361/681 |
| 5,337,212 A | | 8/1994 | Bartlett et al. | |
| 5,494,447 A | * | 2/1996 | Zaidan | 439/31 |
| 5,548,478 A | * | 8/1996 | Kumar et al. | 361/681 |
| 5,644,469 A | * | 7/1997 | Shioya et al. | 361/681 |
| 5,900,848 A | * | 5/1999 | Haneda et al. | 345/1.1 |
| 6,262,885 B1 | * | 7/2001 | Emma et al. | 361/683 |
| 6,275,376 B1 | * | 8/2001 | Moon | 361/683 |
| 6,532,147 B1 | * | 3/2003 | Christ, Jr. | 361/683 |
| 6,665,175 B1 | * | 12/2003 | deBoer et al. | 361/681 |
| 6,826,043 B2 | * | 11/2004 | Chang | 361/683 |
| 6,972,947 B2 | * | 12/2005 | Duncan | 361/683 |
| 6,989,985 B2 | * | 1/2006 | Tanimoto et al. | 361/681 |
| 7,079,389 B2 | * | 7/2006 | Tago | 361/687 |
| 7,158,634 B2 | * | 1/2007 | Eromaki | 379/433.13 |
| 7,184,263 B1 | * | 2/2007 | Maskatia | 361/683 |
| 7,277,275 B2 | * | 10/2007 | Won et al. | 361/681 |
| 2006/0039104 A1 | * | 2/2006 | Wang et al. | 361/681 |
| 2006/0274490 A1 | * | 12/2006 | Cheng | 361/683 |

FOREIGN PATENT DOCUMENTS

CN    2607607 Y    3/2004
CN    2636370 Y    8/2004

* cited by examiner

*Primary Examiner*—Lisa Lea-Edmonds
(74) *Attorney, Agent, or Firm*—Birch, Stewart, Kolasch & Birch, LLP

(57) ABSTRACT

A portable electronic device. The portable electronic device includes a base, a body, and a connecting mechanism. The body has a first surface and a second surface, wherein the first surface faces the base. The connecting mechanism rotatably connects the base and the body. The connecting mechanism rotates relative to the base to a specific angle. The body rotates relative to the connecting mechanism, allowing the second surface to face the base.

9 Claims, 27 Drawing Sheets

PORTABLE ELECTRONIC DEVICE

BACKGROUND

The invention relates to a portable electronic device.

FIG. 1 shows a conventional portable electronic device 1 comprising a body 2 and a cover 3. The cover 3 is hinged on the body. During operation, the cover 3 is separated from the body 2, forming an angle therebetween and exposing a display 4. However, operation or opening the cover 3 requires space, limiting usage of the device.

SUMMARY

Accordingly, the invention provides a portable electronic device comprising a base, a body and a connecting mechanism. The body has a first surface and a second surface. The connecting mechanism rotatably connects to the base and the body. The connecting mechanism rotates relative to the base and the body, allowing the base to face the first surface or the second surface of the body.

The body comprises a protrusion and the connecting mechanism comprises an opening. The protrusion moves and rotates in the opening between a first area and a second area of the opening.

The connecting mechanism comprises a first end pivoting on the base, allowing the base to rotate relative to the connecting mechanism.

When the protrusion is at the first area of the opening, a first distance is defined between the protrusion and the first end. When the protrusion is at the second area of the opening, a second distance is defined between the protrusion and the first end, exceeding the first distance.

The portable electronic device further comprises an elastic element disposed on the periphery of the opening and abutted the protrusion.

The connecting mechanism is a telescopic link, operated by hydraulic pressure or pneumatic pressure.

The telescopic link comprises a first rod pivoting on the base, and a second rod pivoting on the body.

The first rod comprises a first axle, connected with the base, allowing the first rod to rotate relative to the base. The second rod comprises a second axle, connected with the body, allowing the second rod to rotate relative to the body.

The connecting mechanism, pivoted on the base and the body, is telescopic, and comprises an elastic element, providing elasticity to the connecting mechanism.

The connecting mechanism comprises a pair of first connectors pivoted on the body, connected by an axle.

The portable electronic device further comprises a fixing member, fixing the axle to the base in a rotatable manner.

Each first connector comprises a first connecting portion and a second connecting portion. A notch is formed between the first and second connecting portions for the elastic element to be disposed therein.

The elastic element connects the first connecting portion and the second connecting portion.

The first connecting portion rotatably connects to the base by the axle. The second connecting portion rotatably connects to the body.

The connecting mechanism further comprises a pair of second connectors, fixed to the body and connected with the first connectors respectively in a rotatable manner.

The connecting mechanism comprises a first connector pivoted on the base, and a second connector fixed to the body and pivoting on the first connector.

The invention provides another portable electronic device, comprising a base, a body and a connecting mechanism. The body has a first surface and a second surface, wherein the first surface faces the base. The connecting mechanism rotatably connects the base and the body. The connecting mechanism rotates relative to the base to a specific angle. The body rotates relative to the connecting mechanism, allowing the second surface faces the base.

The specific angle exceeds 60° or is less than 80°.

DESCRIPTION OF THE DRAWINGS

The invention can be more fully understood by reading the subsequent detailed description and examples with references made to the accompanying drawings, wherein.

DETAILED DESCRIPTION

First Embodiment

Figure 1:
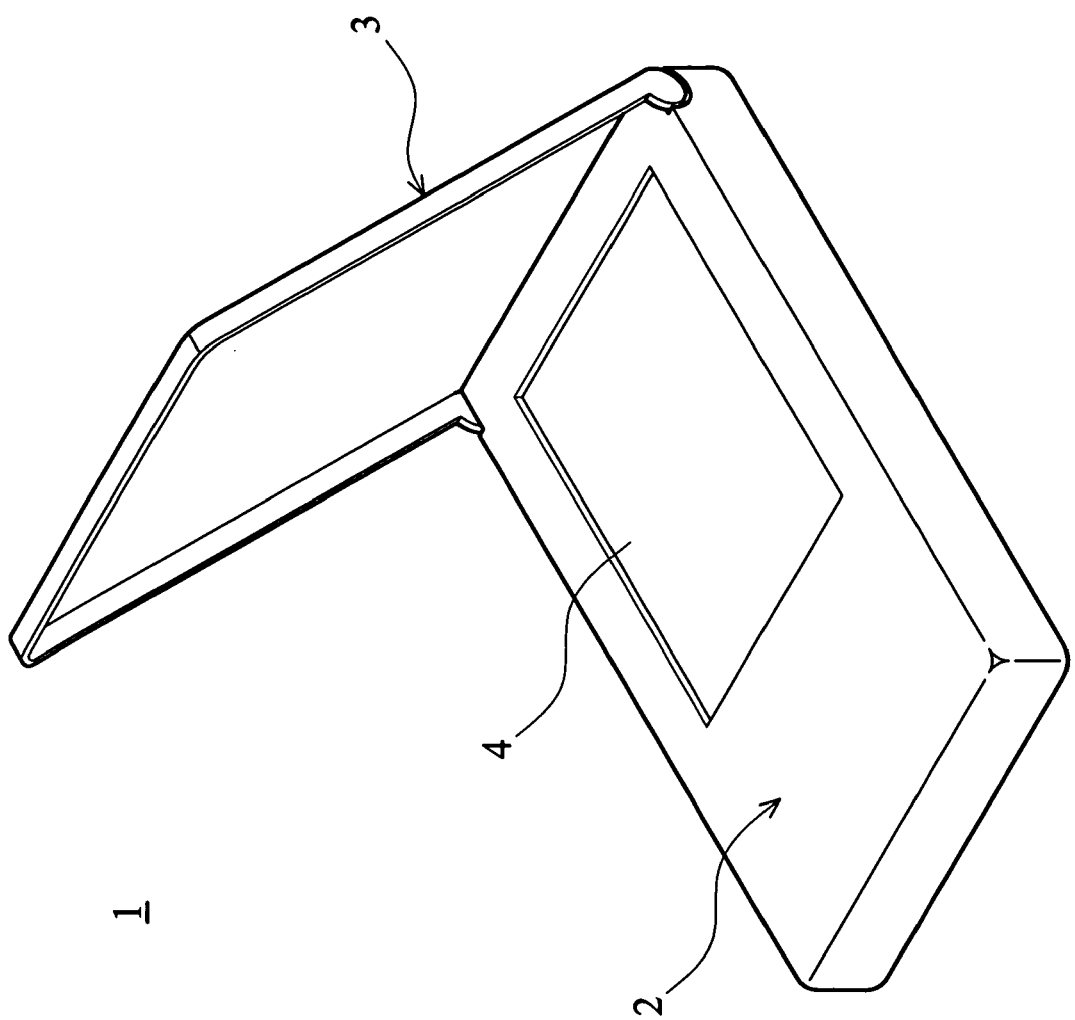
FIG. 1 is a schematic view of a conventional portable electronic device.
Figure 2A:
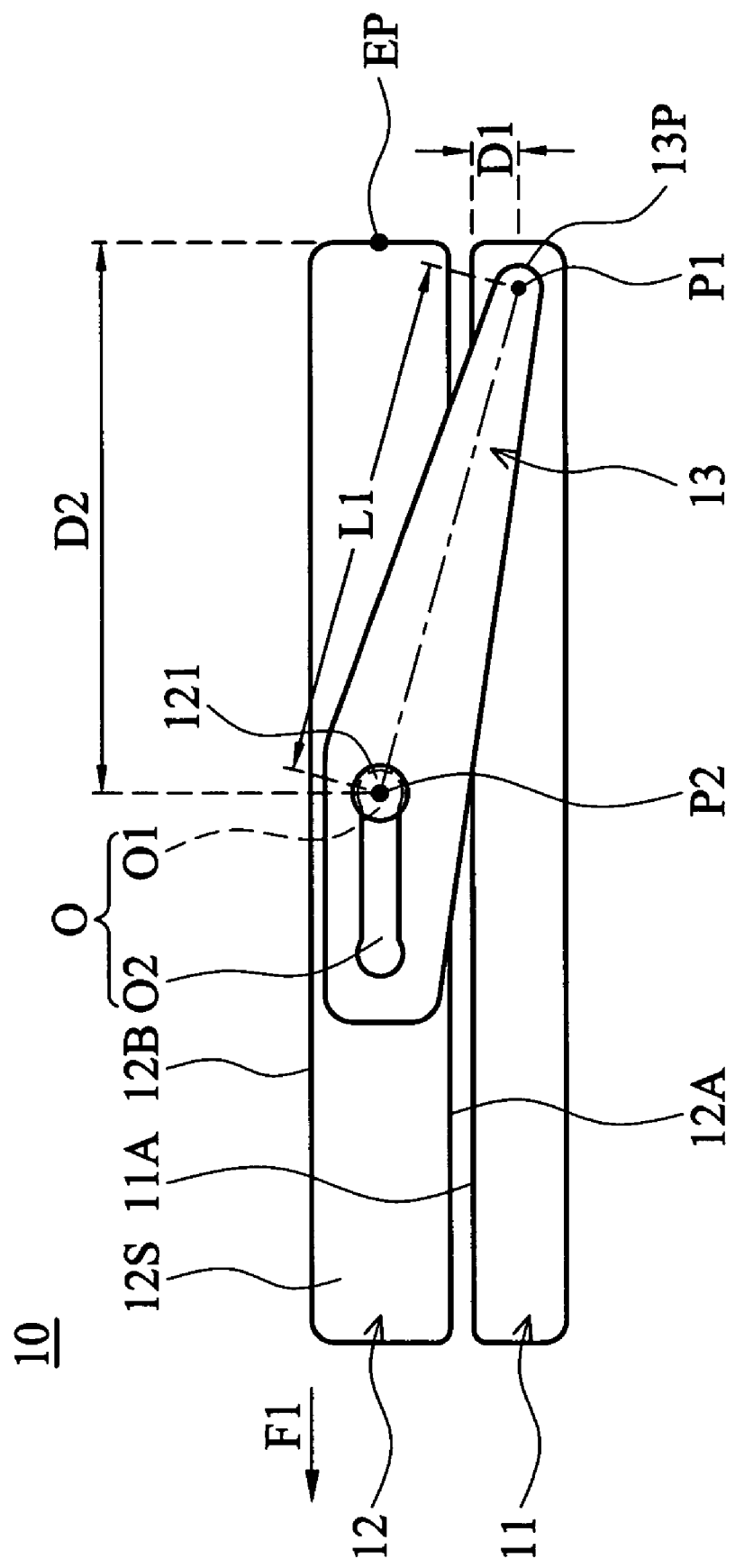
FIG. 2A is an elevated view of a first embodiment of a portable electronic device.
Figure 2B:
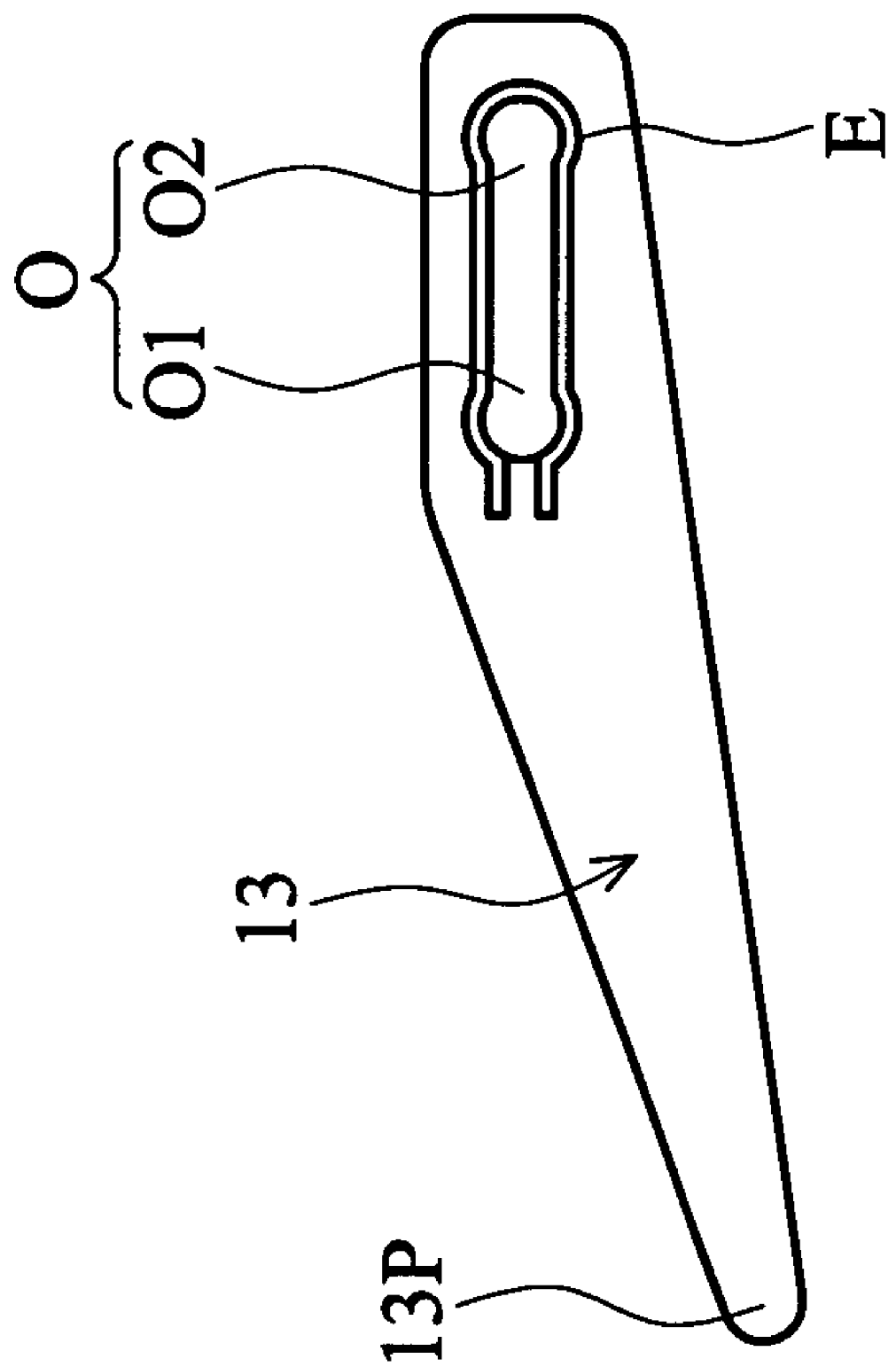
FIG. 2B is a schematic view of a first embodiment showing an inner side of a connecting mechanism in the first embodiment.

Referring to FIG. 2, the portable electronic device 10 of the embodiment is a personal digital assistant (PDA), comprising a base 11, a body 12, a connecting mechanism 13 and an elastic element E (as shown in FIG. 2B), wherein the elastic element E is an elastic line.

Figure 3A:
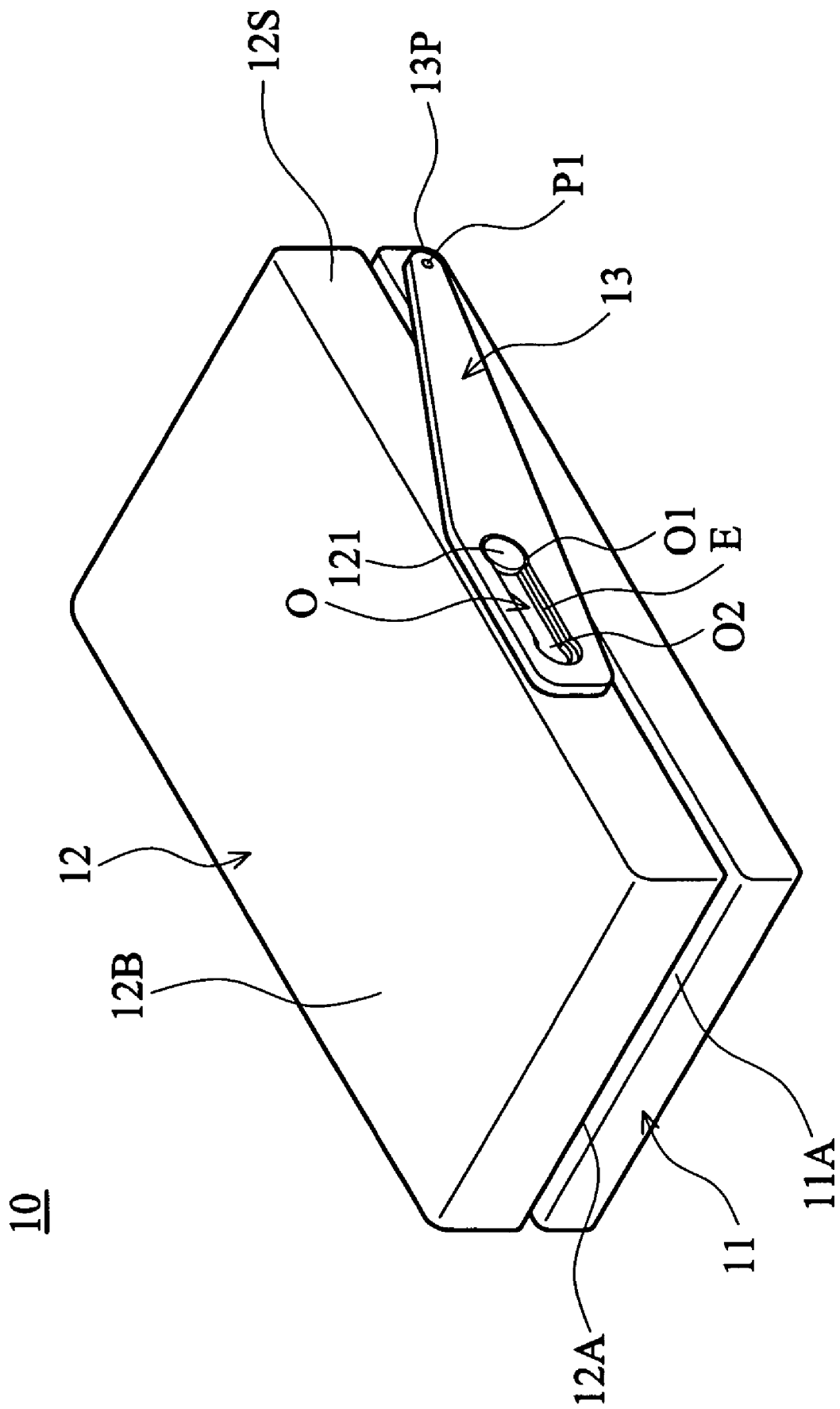
FIGS. 3A-3F are schematic views of a portable electronic device of a first embodiment from closed to open position.
Figure 3B:
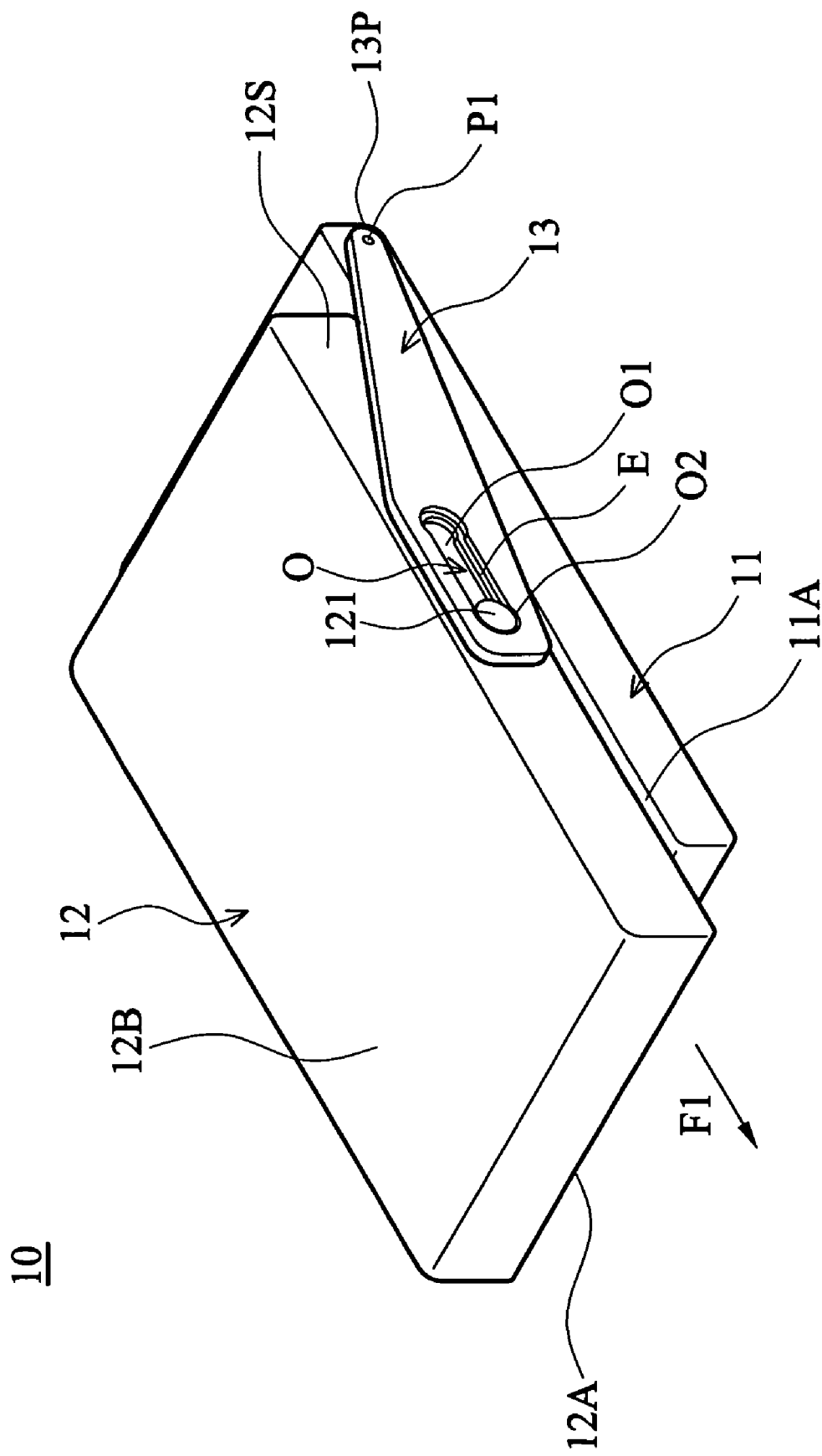
Figure 3C:
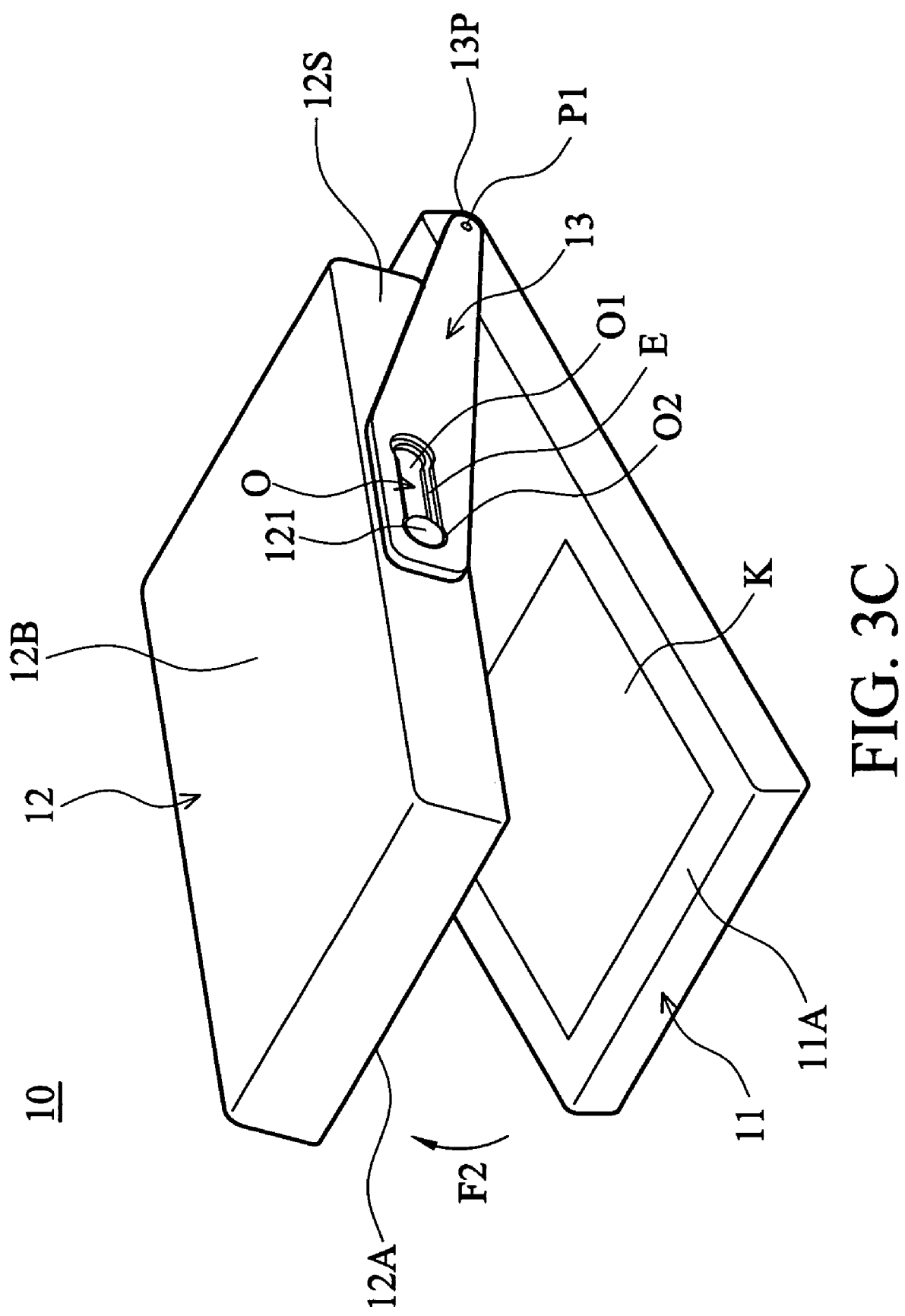
Figure 3D:
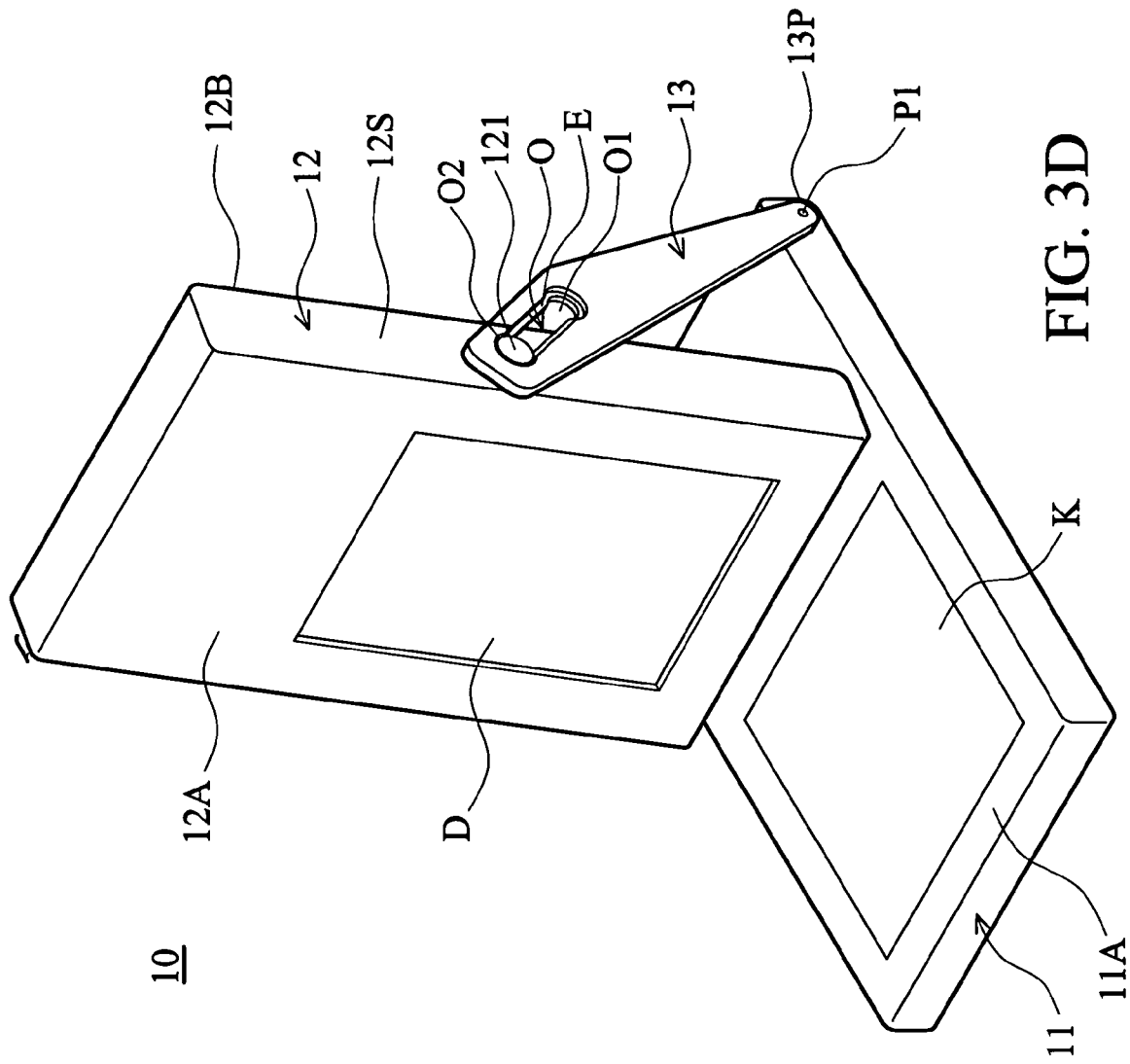
Figure 3E:
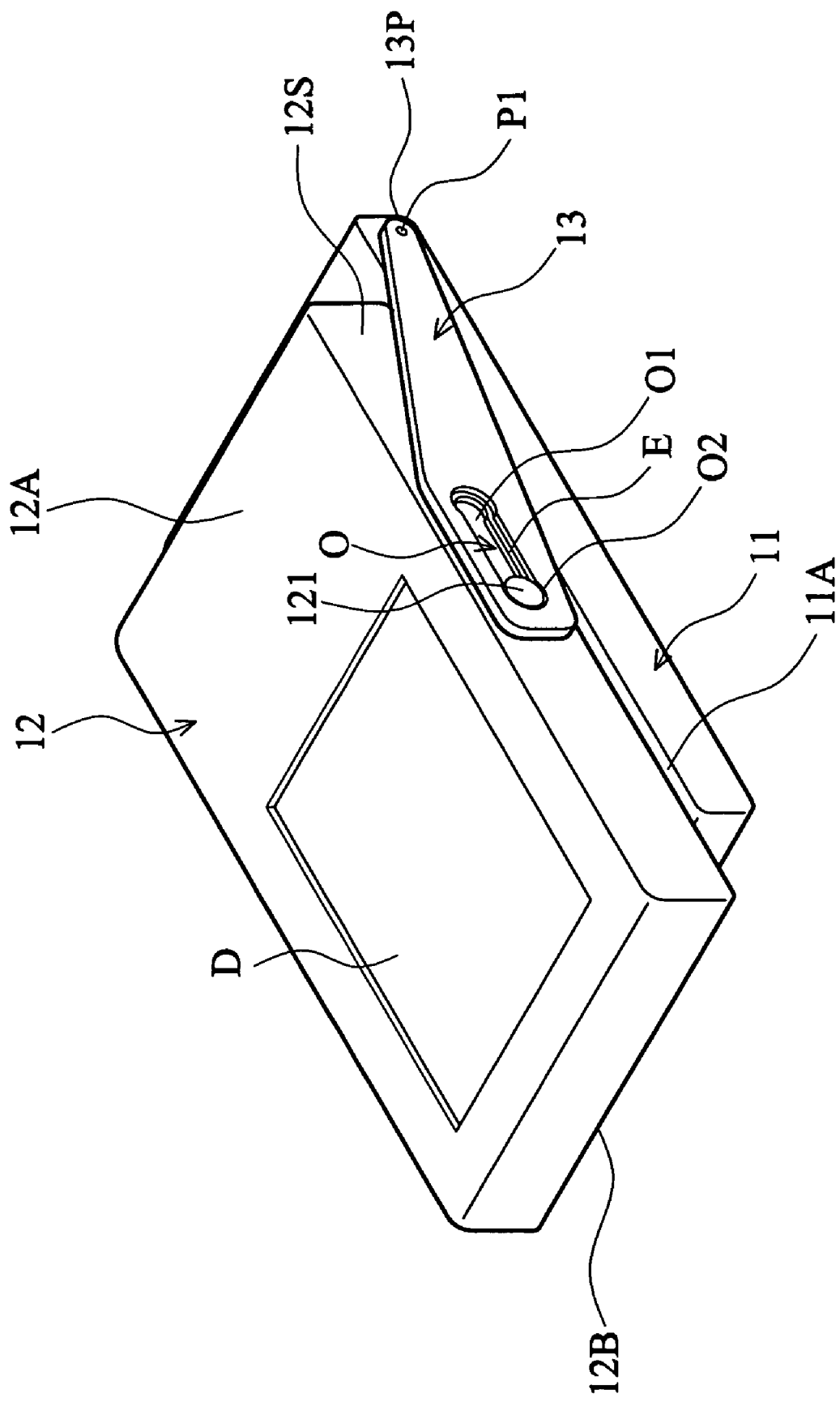
Figure 3F:
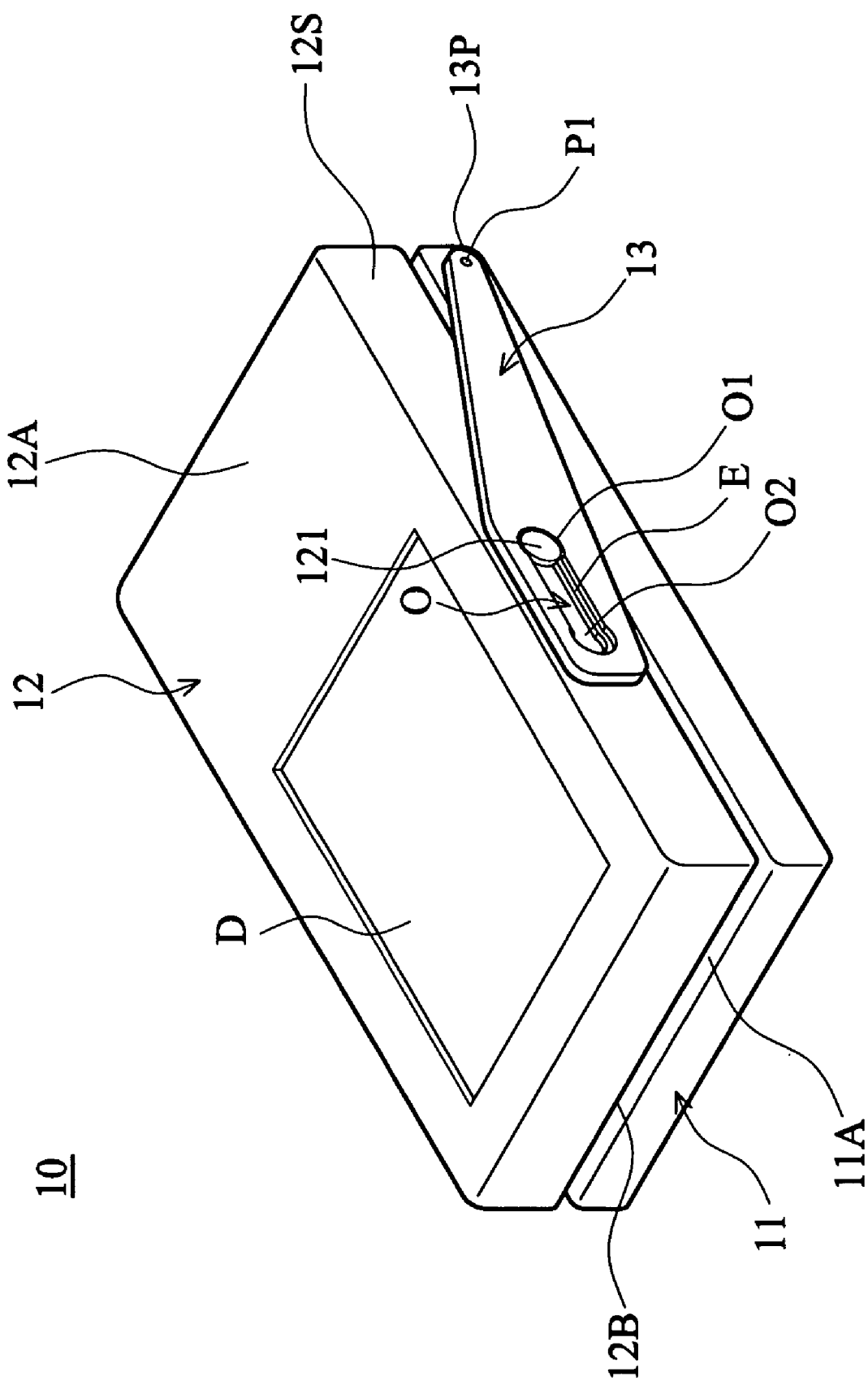

The base 11 comprises a keyboard K (as shown in FIG. 3D), and has a first connecting point P1 and a first surface 11A, wherein a first distance D1 is formed between the first connecting point P1 and the first surface 11A.

The body 12 has a first surface 12A, a second surface 12b, a second connecting point P2 and an end point EP, and comprises a touch panel D (as shown in FIG. 3D) and a protrusion 121. The touch panel D is disposed on the first surface 12A. The protrusion 121 is disposed on a side surface 12S of the body 12, corresponding to the second connecting point P2. A second distance D2 is formed between the second point P2 and the end point EP.

The connecting mechanism 13 comprises a first end 13P and an opening O. The connecting mechanism 13 rotatably connects to the base 11 by pivoting the first end 13P on the first connecting point P1, such that the connecting mechanism 13 can rotates relative to the base 11. The opening O is elongated, and has a first area O1 and a second area O2. When the body 12 and the base 11 close, the opening O extends parallel to the side surface 12S of the body 12.

The elastic element E is disposed at the opening O (as shown in FIG. 2B). The protrusion 121, passing through the opening O, rotates and moves between the first area O1 and the second area O2, allowing the body 12 to rotate relative to the connecting mechanism 13. The protrusion 121 abuts the elastic element E, and is oriented in any position of the opening O by the elasticity of the elastic element E, preventing the protrusion 121 from separating from the opening O.

FIGS. 3A-3F depict a portable electronic device 10 from closed to open position. When the body 12 and the base 11 of the portable electronic device 10 close, the first surface 12A of the body 12 faces the base 11, and the protrusion 121 of the body 12 is in the first area O1 of the opening O of the connecting mechanism 13 (as shown in FIGS. 2A and 3A). A first length L1 is formed between the first connecting point P1 and the second connecting point P2 (as shown in FIG. 2A).

Figure 8A:
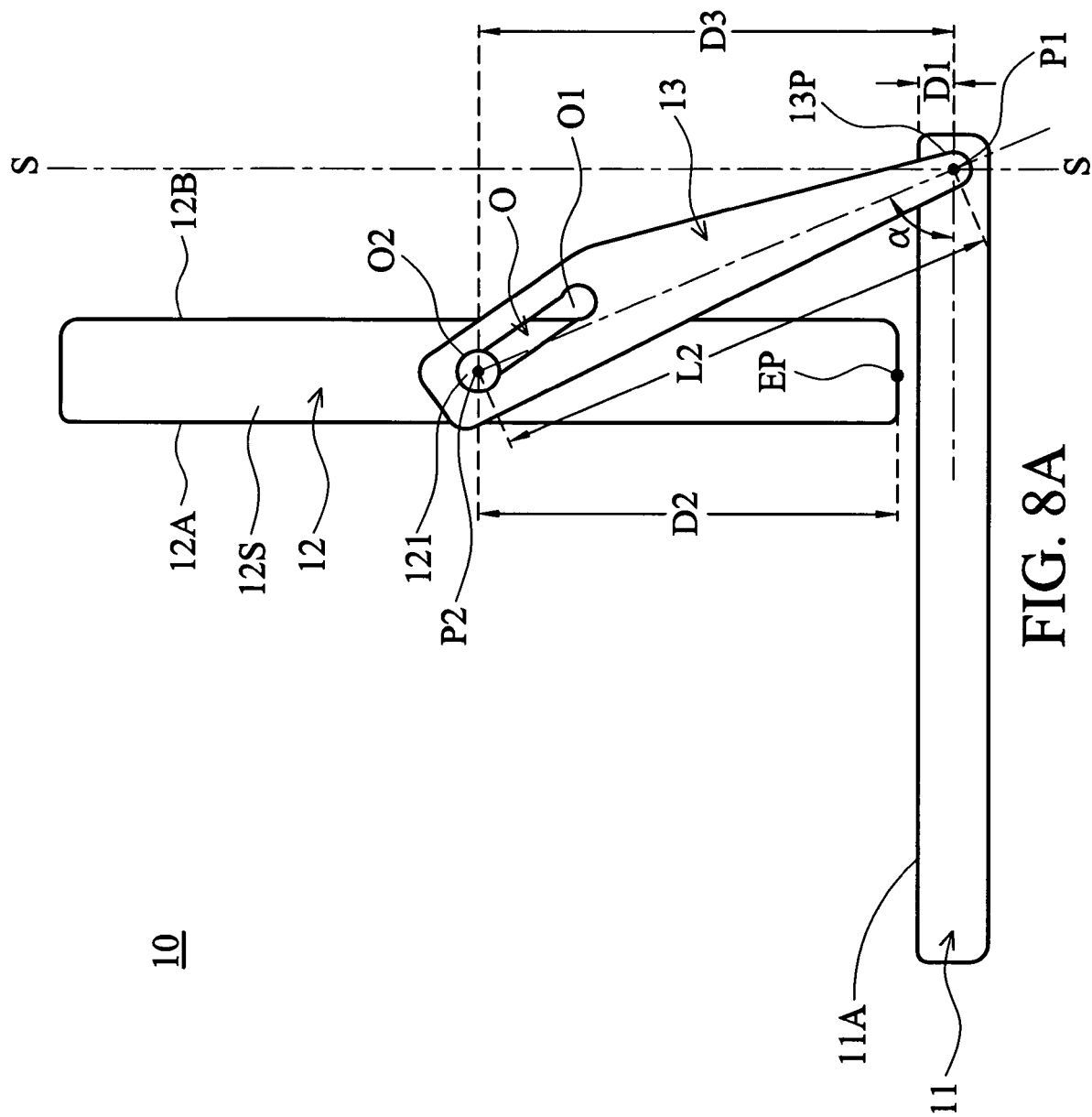
FIGS. 8A-8C are elevated views of a portable electronic device of first, second and third embodiments, respectively.

To separate the body 12 and the base 11, force is applied in a direction F1 (referring to FIGS. 2A and 3B), moving the protrusion 121 from the first area O1 to the second area O2 (as shown in FIG. 3B). A second length L2 is formed between the first connecting point P1 and the second connecting point P2 (as shown in FIG. 8A). The second length L2 exceeds the first length L1. The body 12 is then moved in a direction F2, allowing the body 12 to rotate relative to the connecting mechanism 13 (as shown in FIG. 3C), and the body 12 to rotate relative to the connecting mechanism 13 (as shown in FIG. 3D). The body 12 is moved opposite to direction F2 until the body 12 is parallel to the base 12. Finally, force applied opposite to direction F1 moves protrusion 121 to the first area O1 of the opening O. A touch screen display D is exposed, allowing operation of the portable electronic device 10.

Second Embodiment

Figure 4:
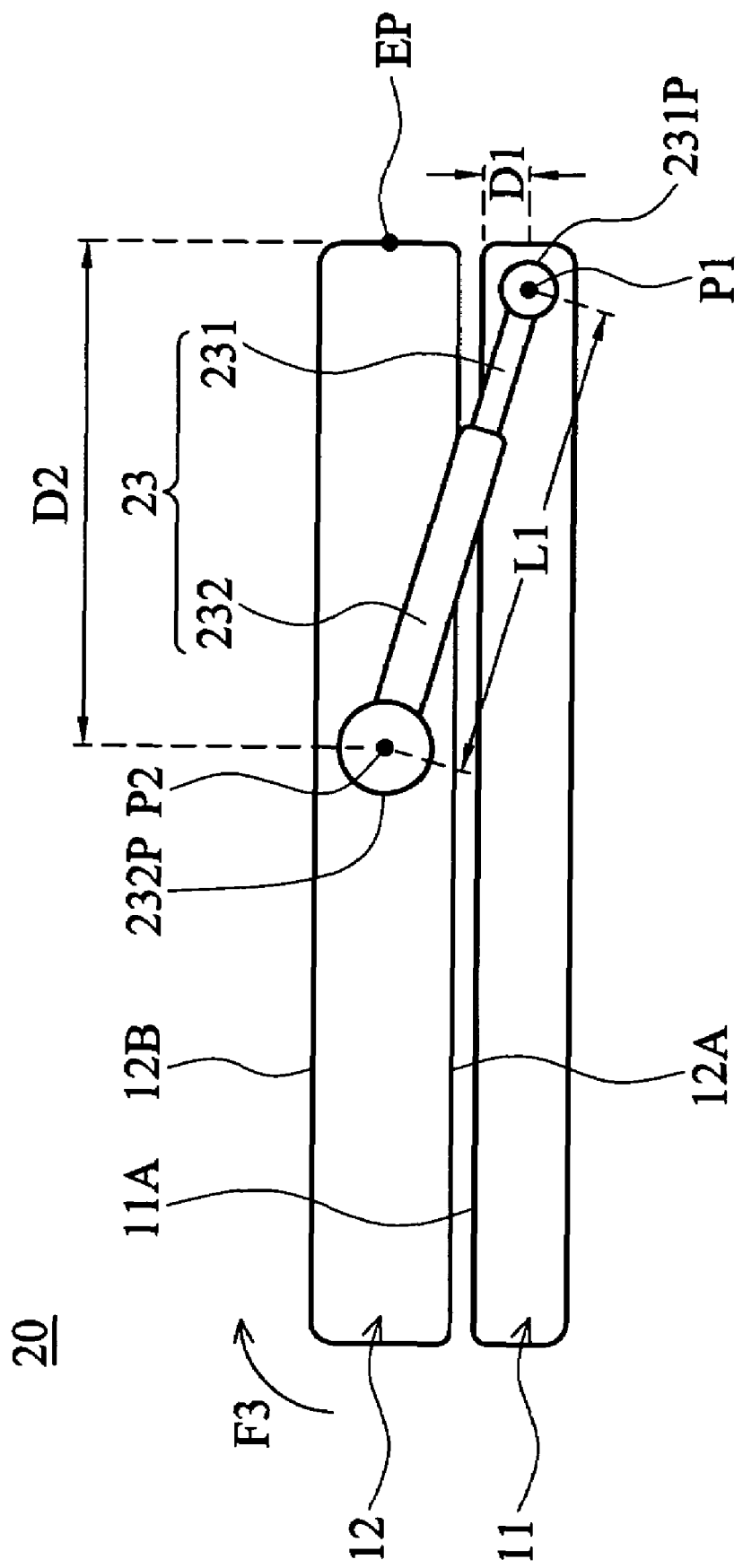
FIG. 4 is an elevated view of a second embodiment of a portable electronic device.

Referring to FIG. 4, in the second embodiment, the connecting mechanism 23 of the portable electronic device 20 is a telescopic link. The telescopic link is operated by hydraulic pressure or pneumatic pressure. Other elements are the same as the portable electronic device 10 in the first embodiment.

Figure 8B:
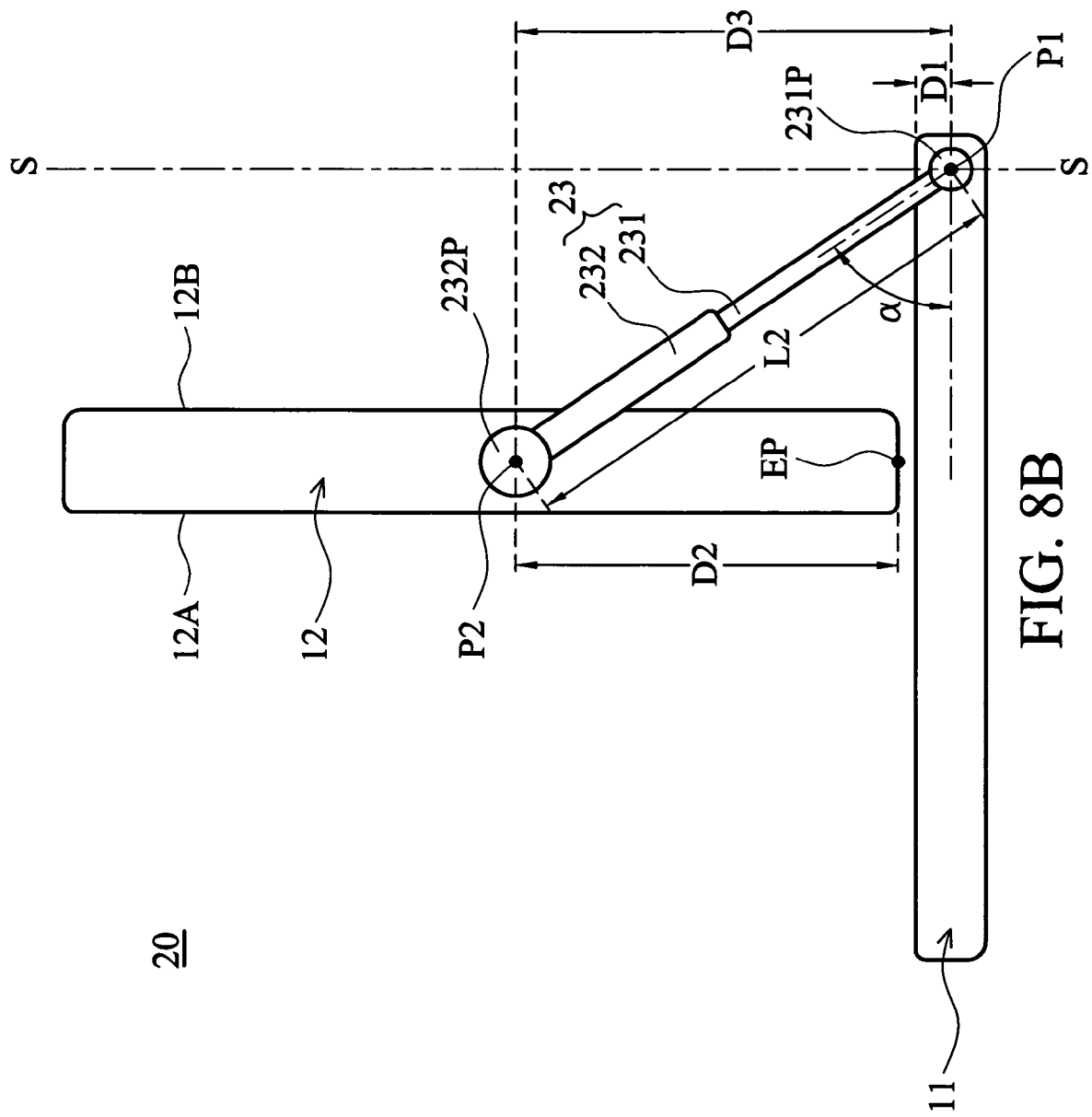

The telescopic link 23 comprises a first rod 231 and a second rod 232. The first rod 231 is telescoped in the second rod 232. The telescopic link 23 is operated by hydraulic or pneumatic pressure, allowing the telescopic link to be easily extended or telescoped. The telescopic link has a first length L1 (as shown in FIG. 4) when telescoped, and a second length L2 (as shown in FIG. 8B) when extended.

The first rod 231 comprises a first axle 231P rotatably connecting to the first connecting point P1 of the base 11, allowing the telescopic link 23 to rotate relative to the base 11. The second rod 232 comprises a second axle 232P rotatably connecting to the second connecting point P2 of the body 12, allowing the telescopic link 23 to rotate relative to the body 12.

Figure 5A:
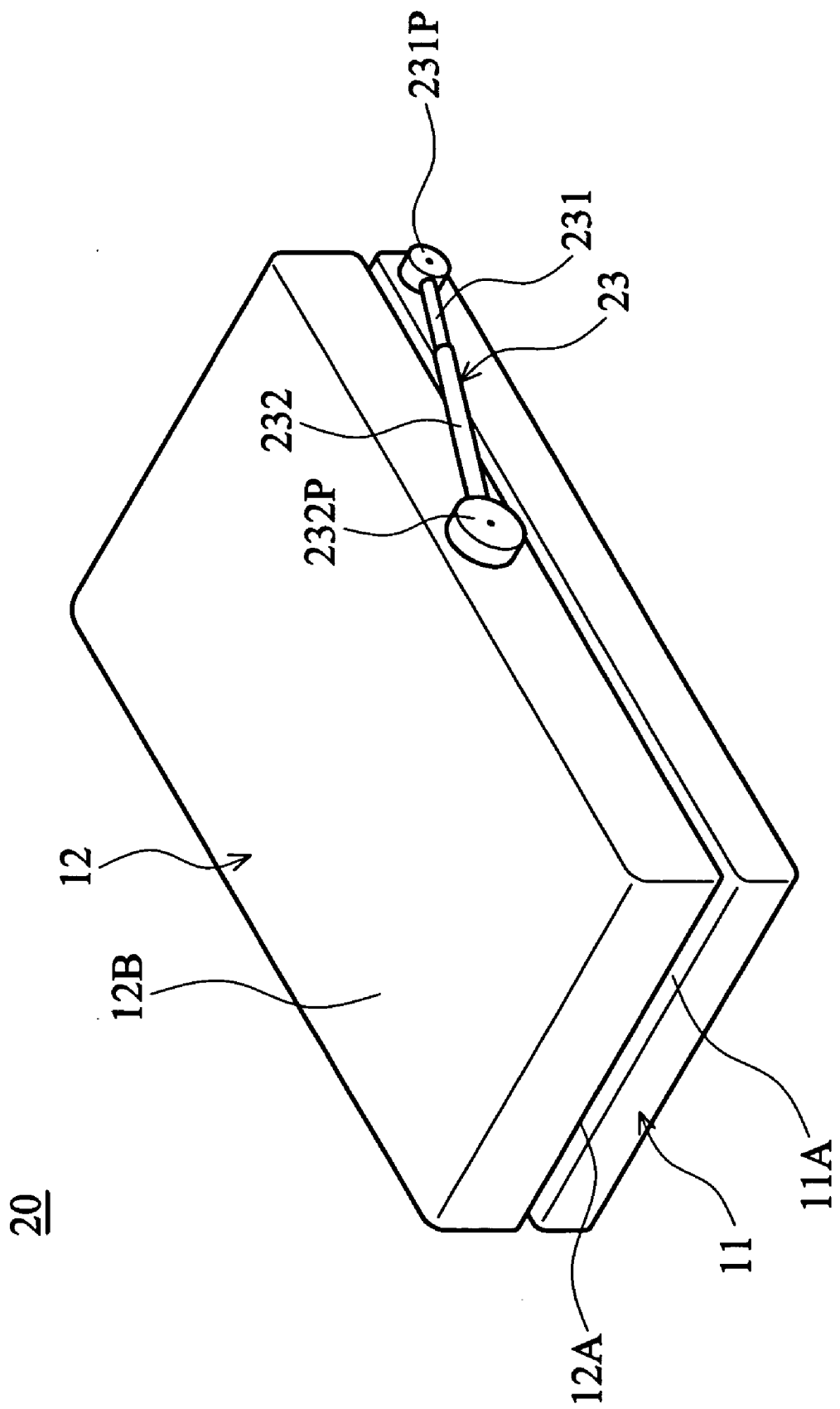
FIGS. 5A-5F are schematic views of a portable electronic device of a second embodiment from closed to open position.
Figure 5B:
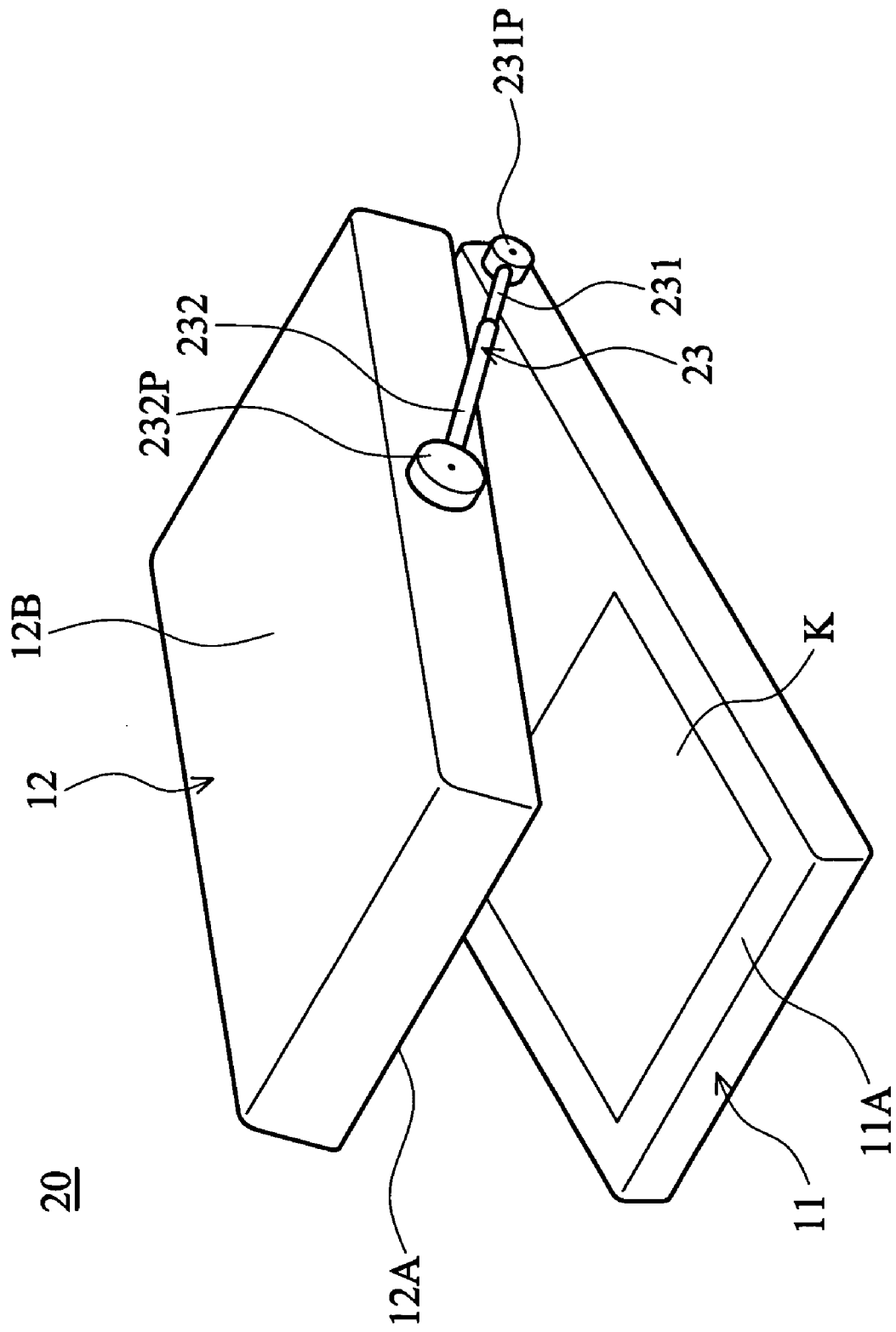
Figure 5C:
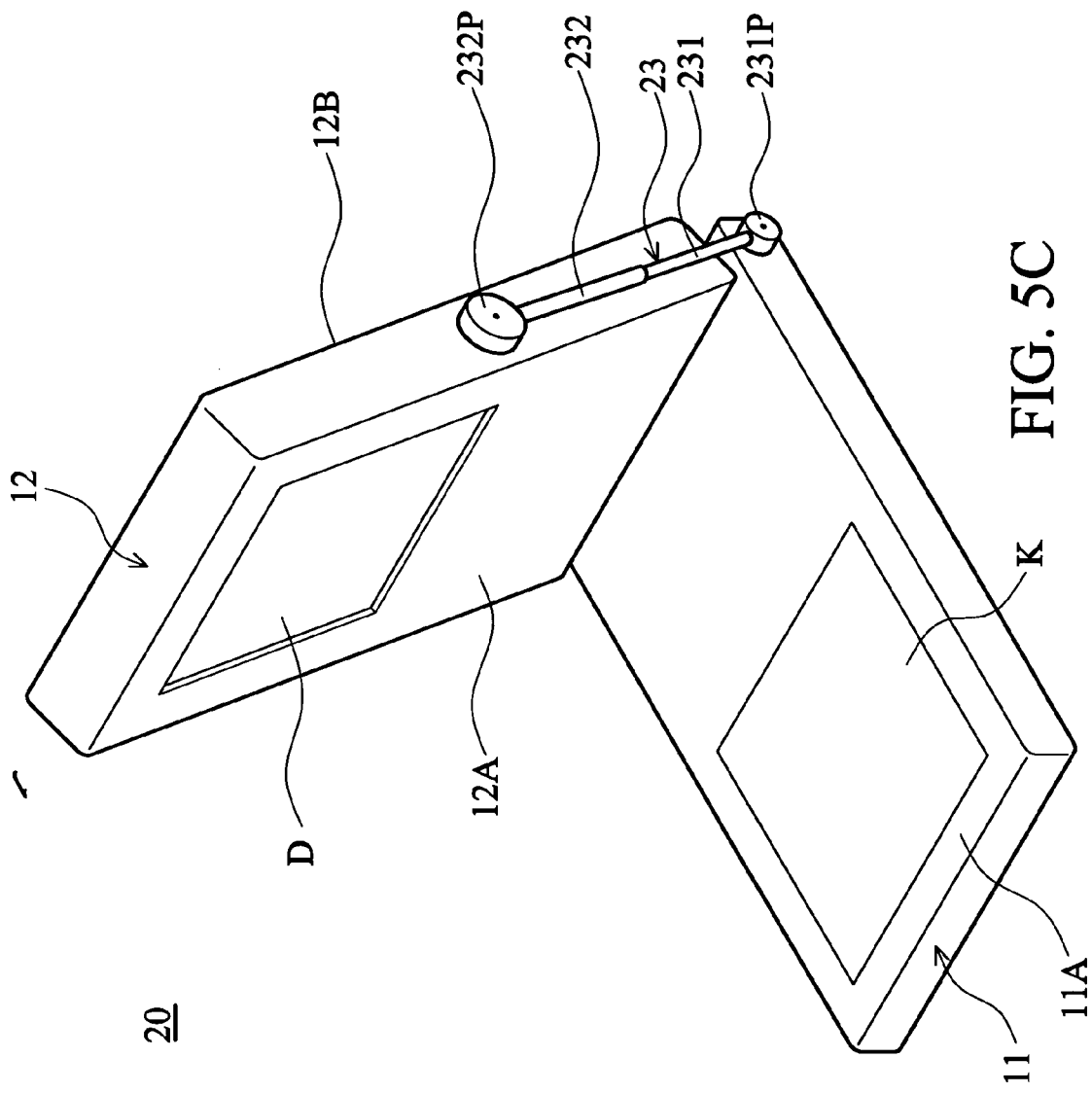

FIGS. 5A-5F depict a portable electronic device 20 from closed to open position. When the body 12 and the base 11 of the portable electronic device 10 close, the first surface 12A of the body 12 faces the base 11 (as shown in FIG. 5A). To separate the body 12 and the base 11, force is applied in direction F3 (referring to FIG. 4), allowing the body 12 to rotate relative to the telescopic link 23, and the telescopic link 23 to rotate relative to the base 11. Pressure on the telescopic link 23 is released, and the first length L1 of the telescopic link 23 changes to the second length L2 (as shown in FIG. 8B). Finally, force applied to the body 12 indirectly returns telescopic link 23 to the first length L1, and closes the body 12 and the base 11. A touch screen display D is exposed, allowing operation of the portable electronic device 20.

Third Embodiment

Figure 6A:
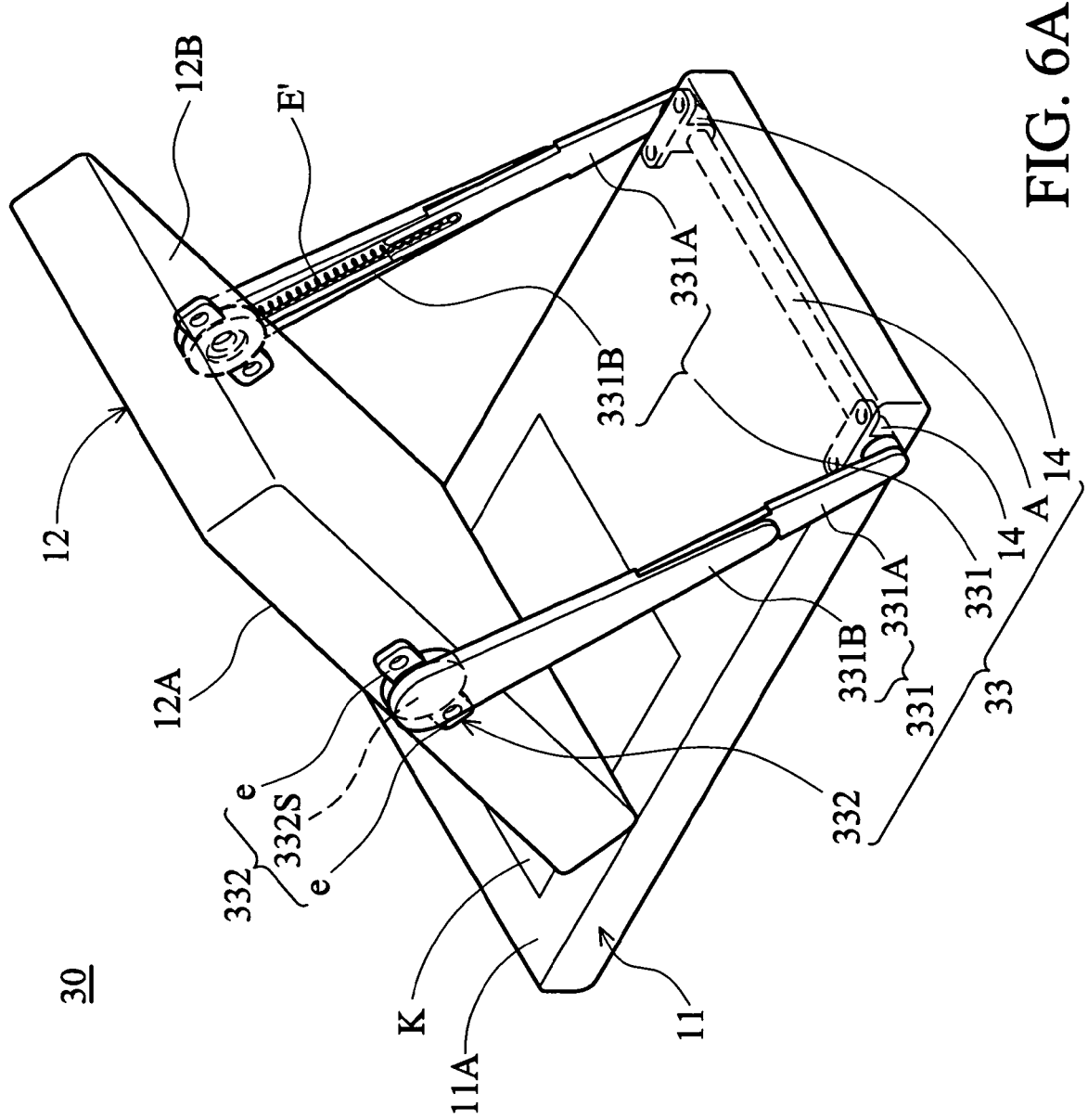
FIG. 6A is an elevated view of a third embodiment of a portable electronic device.
Figure 6B:
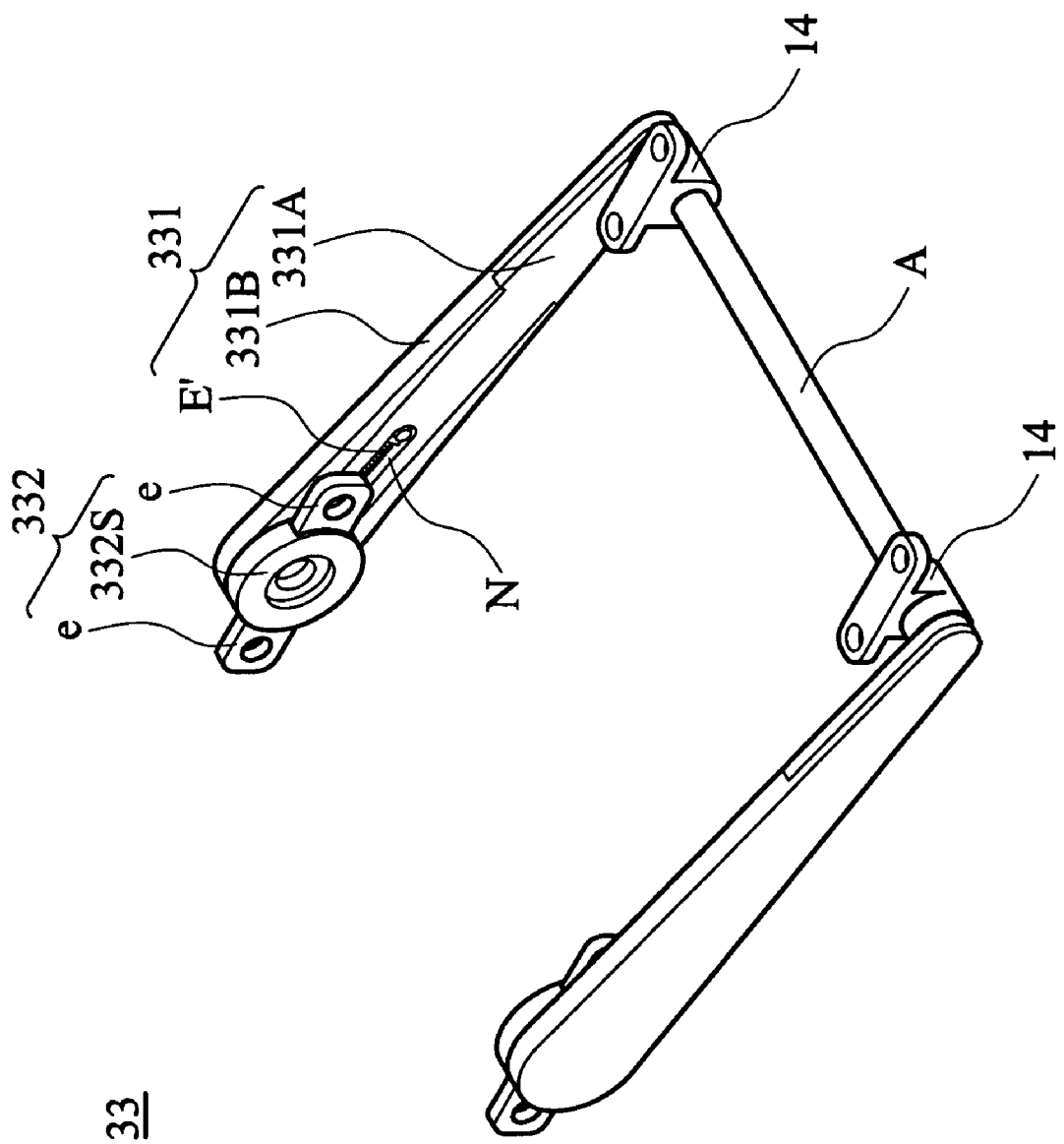
FIGS. 6B and 6C are schematic views of A connecting mechanism in A third embodiment.
Figure 6C:
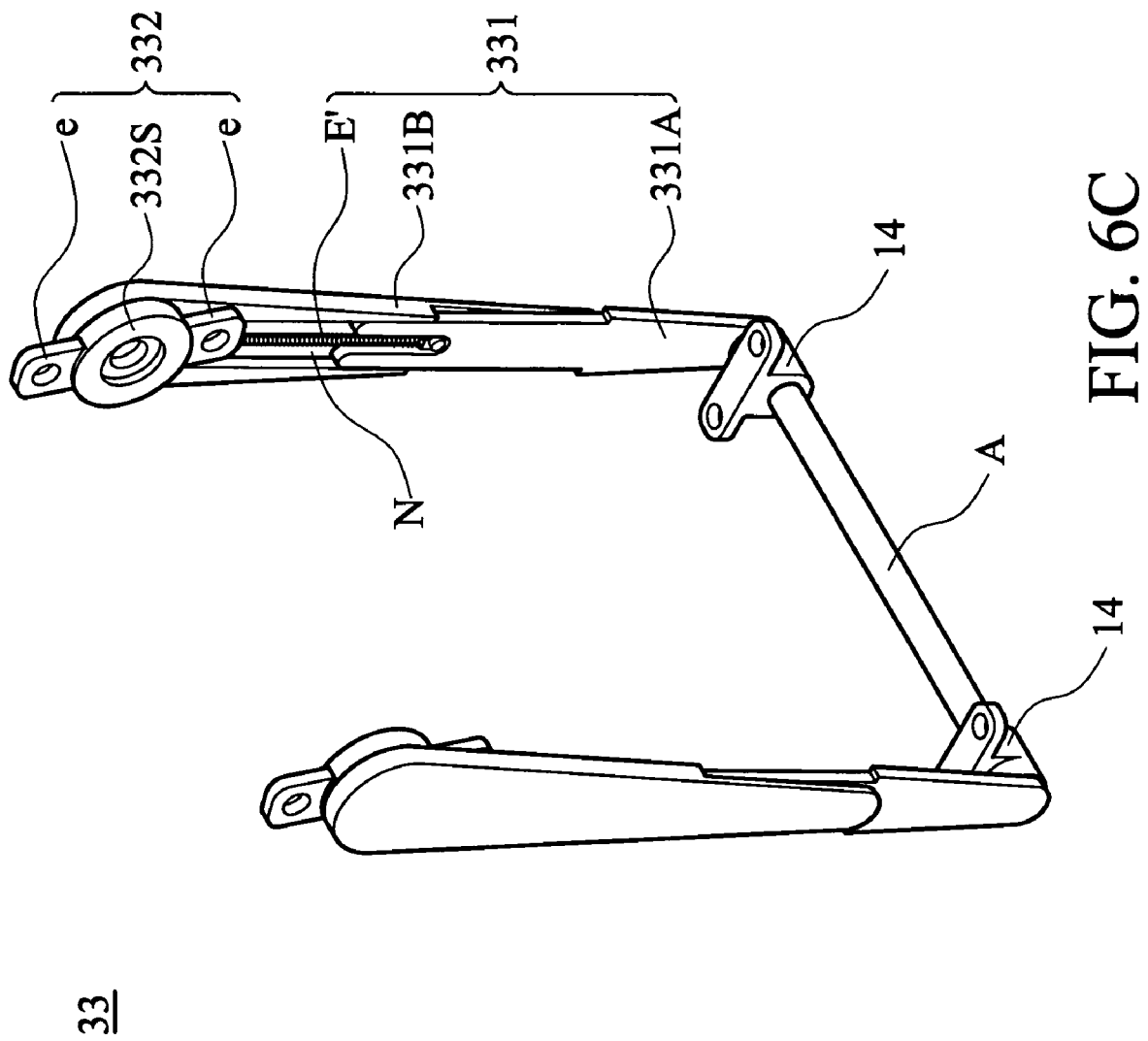

Referring to FIGS. 6A-6C, in the third embodiment, the portable electronic device 30 further comprises two fixing members 14, and the connecting mechanism 33 of the portable electronic device 30 comprises a pair of first connecting members 331, a second connecting member 332, an elastic element E' and an axle A, wherein the elastic element E' is an extension spring. Other elements are the same as the portable electronic device 10 in the first embodiment.

The first connecting member 331 comprises a first connecting portion 331A and a second connecting portion 331B, wherein the first connecting portion 331A moves relative to the second connecting portion 331B, allowing the first member 331 to be extended and telescoped. Two first connecting portions 331A of the first connecting members 331 are connected by the axle A. A notch N is formed between the first connecting portion 331A and the second connecting portion 331B to receive the elastic element E'. Two ends of the elastic element E' connect with first connecting portion 331A and the second connecting portion 331B respectively.

Figure 7A:
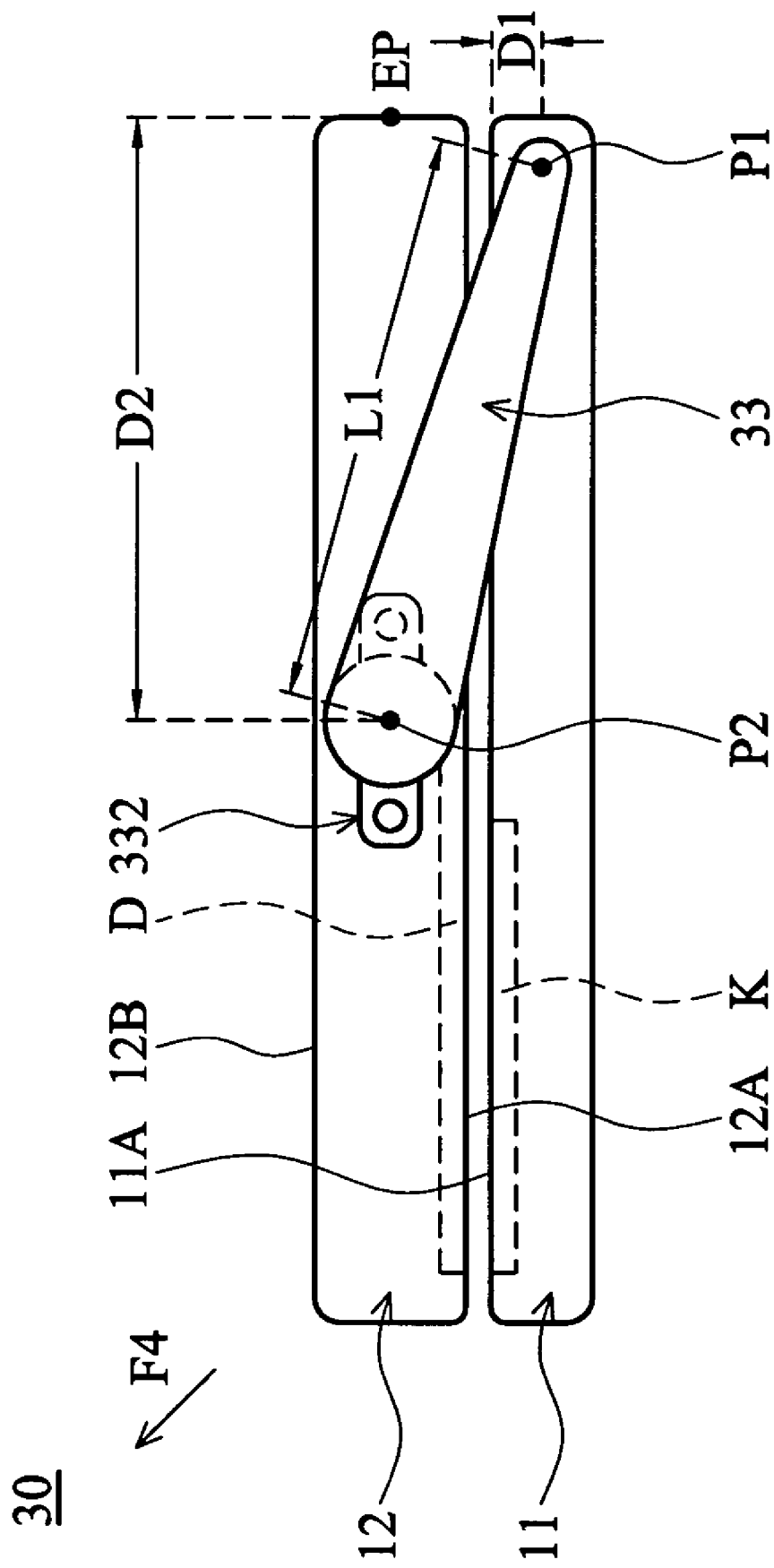
FIGS. 7A-7E are schematic views of a portable electronic device of a third embodiment from closed to open position.

The second connecting member 332 comprises a connecting body 332S and two end portions e. The connecting body 332S aligns with the second connecting point P2 of the body 12 (as shown in FIG. 7A). The second connecting member 332 is connected with the body 12 by fixing two end portions on the body 12.

Figure 7B:
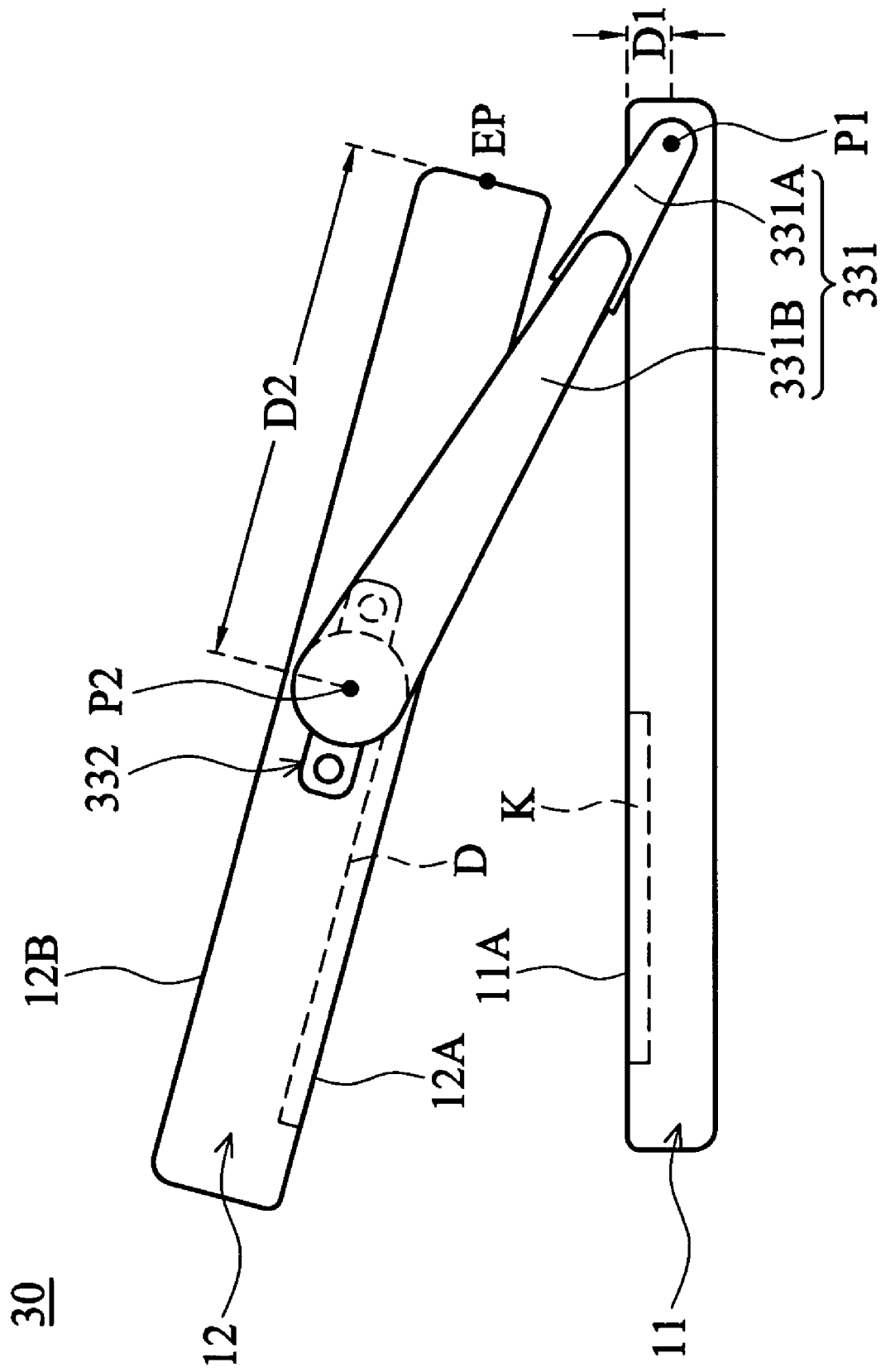
Figure 7C:
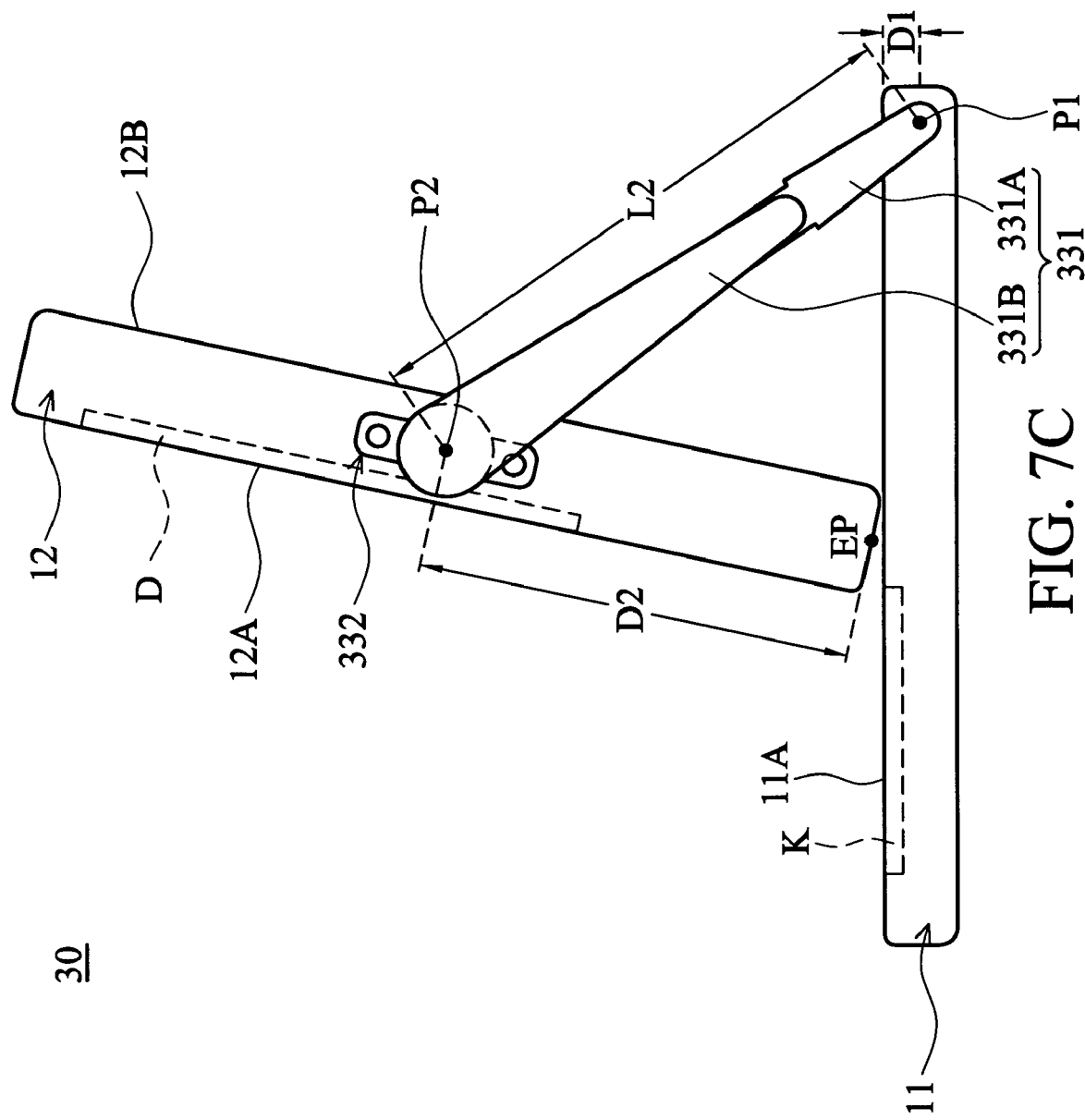

The axle A is fixed to the interior of the base 11 by the fixing members 14 in a rotatable manner (as shown in FIG. 6A), indirectly pivoting the first connecting member 331 on the first connecting point P1 of the base 11 (as shown in FIG. 7B), such that two first connecting members 331 can rotate simultaneously by the axle A. The second connecting portion 331B pivots on the connecting body 332S of the second connecting member 331B (as shown in FIG. 7A), allowing the first connecting member 331 to pivot on the second connecting point P2 of the body 12.

When the body 12 and the base 11 of the portable electronic device 10 close, the first surface 12A of the body 12 faces the base 11. A first length L1 is formed between the first connecting point P1 and the second connecting point P2, and the second connecting portion 331B covers the first connecting portion 331A (as shown in FIG. 7A).

Figure 7D:
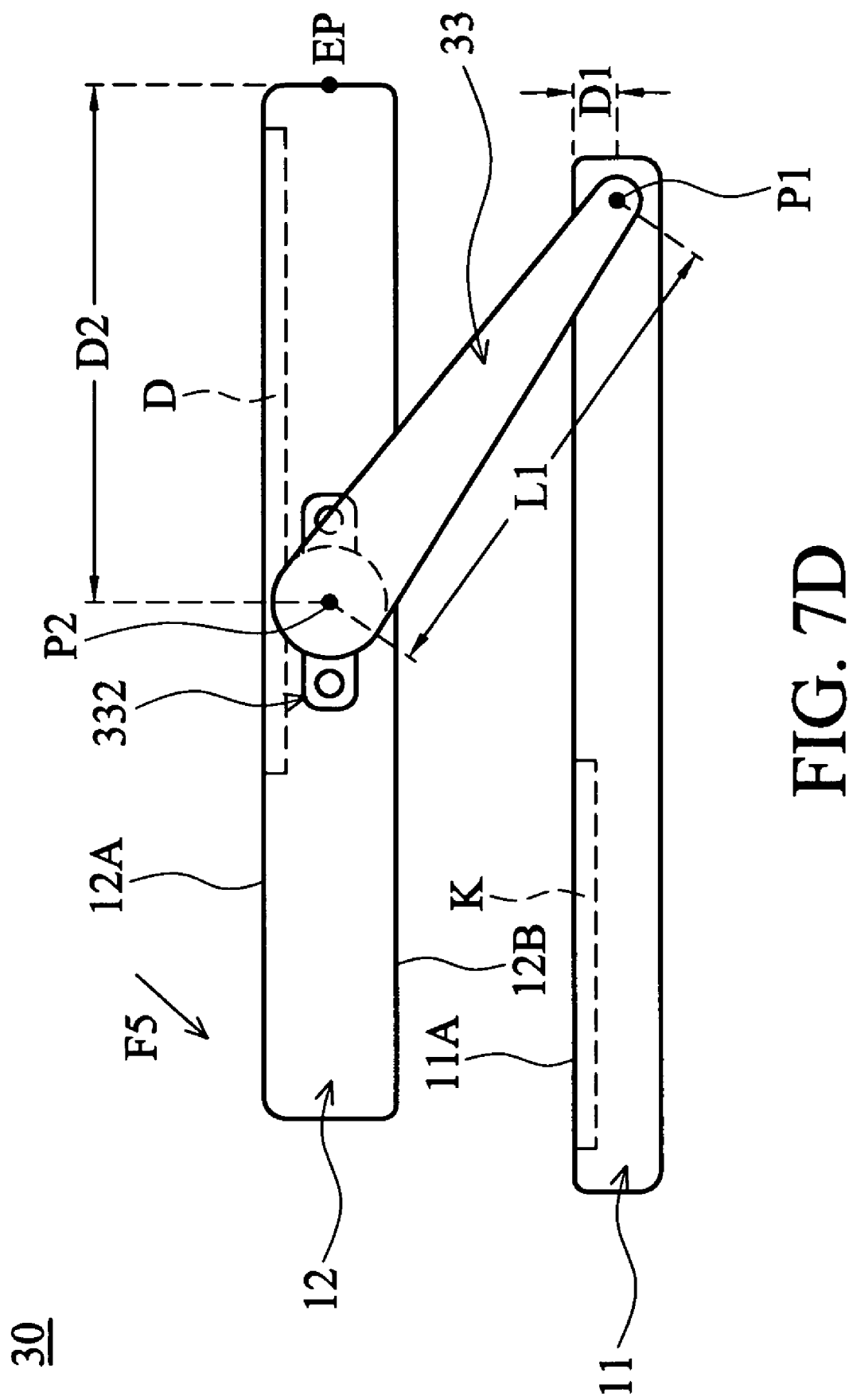
Figure 7E:
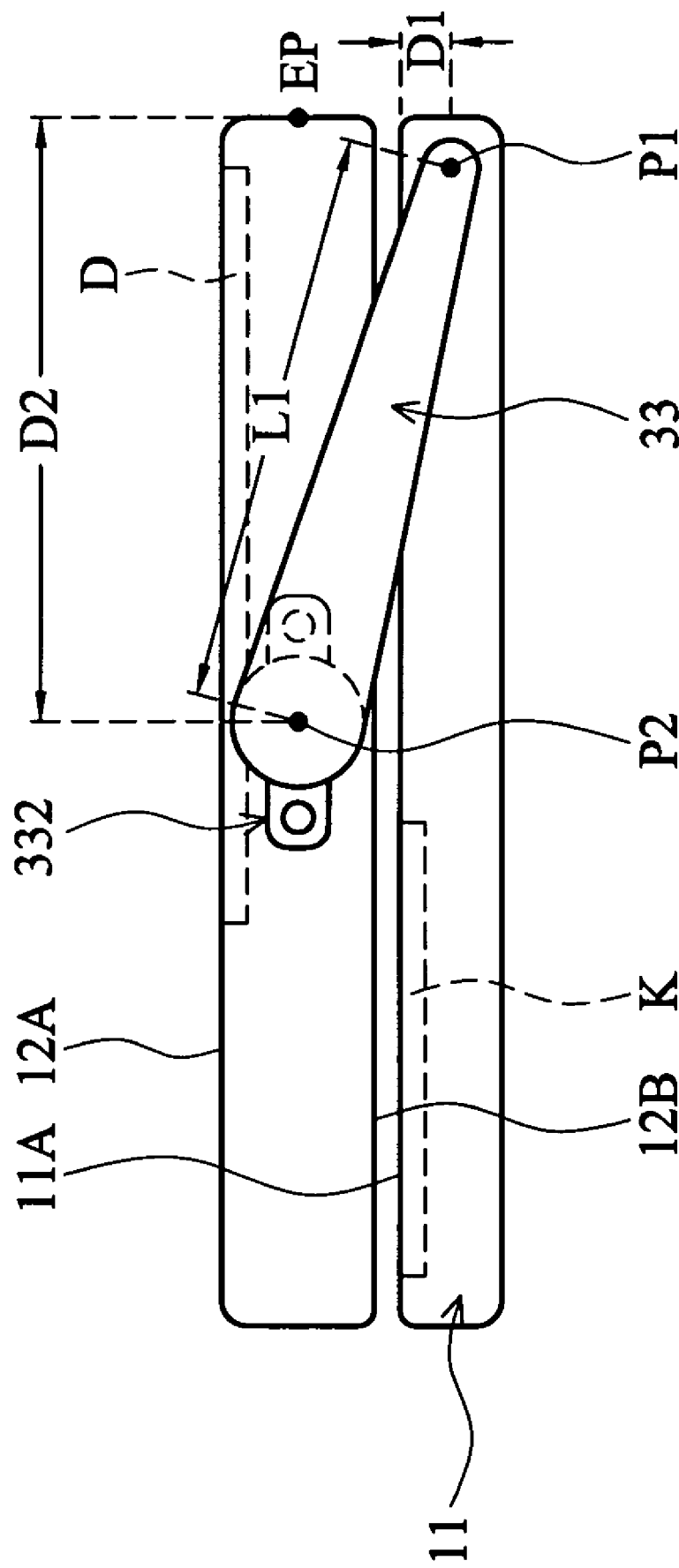

Referring to FIGS. 7A-7E, to open the body 12 and the base 11, force is applied in a direction F4 (referring to FIG. 7A), allowing the body 12 to rotate relative to the first connecting member 33, and the first connecting portion 331A to rotate relative to the base 11. The first connecting member 331 is extended (as shown in FIG. 7B) by pulling the elastic element E', and the first connecting portion 331A is exposed from the second connecting portion 331B. A second length is formed between the first connecting point P1 and the second connecting point P2 (as shown in FIG. 7D). The second length L2 exceeds the first length L1. The elastic element E' provides restoring force to the first connecting portion 331A and the second connecting portion 331B, shortening the first connecting member 331 (as shown in FIG. 7D). Finally, force in a direction F5 (as shown in FIG. 7D), closes the body 12 and the base 11. A touch screen display D is exposed, allowing operation of the portable electronic device 30.

Figure 8C:
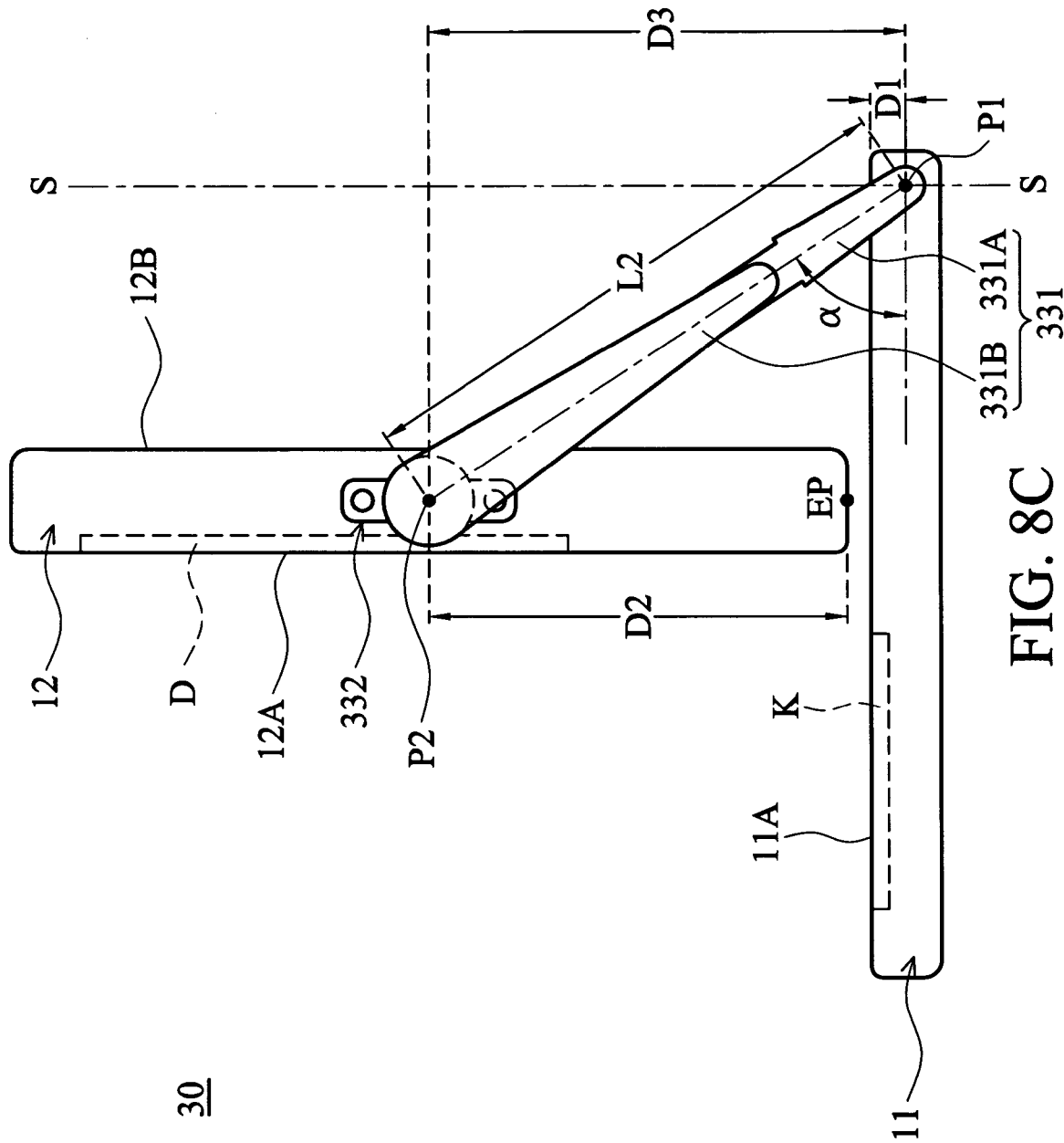

FIGS. 8A-8C depict basic operation of the portable electronic device in the first, second and third embodiment. When the connecting mechanism 13, 23, 33 rotates relative to the base 11 to a specific angle $\alpha$ (preferably between 60 to 80°), the second length L2 projects to a surface S perpendicular to the base 11, forming a projecting length D3. The projecting length D3 less the first length D1 exceeds the second length D2, such that the second surface 12B can be rotated to face the base 11.

Figure 5D:
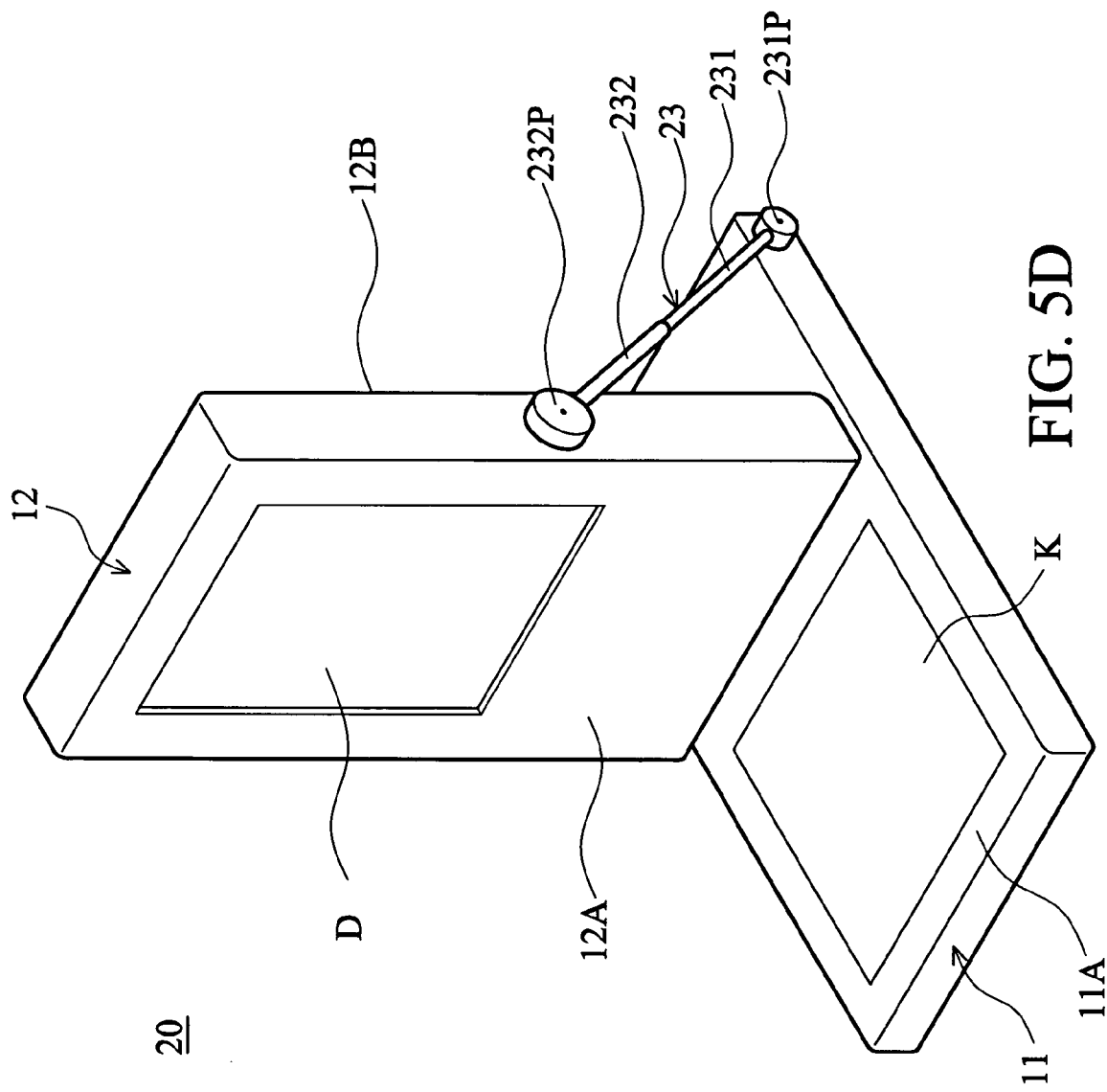
Figure 5E:
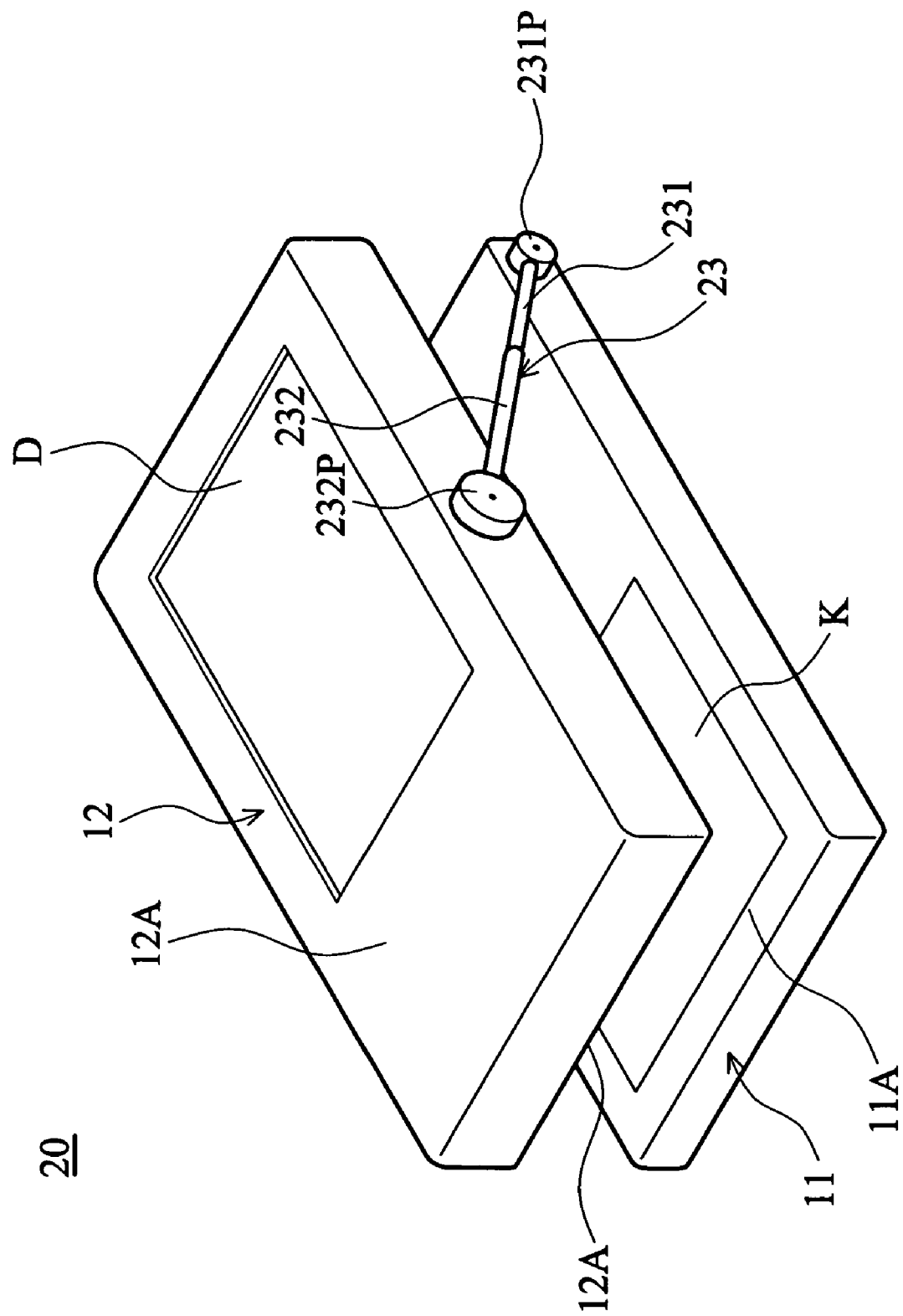
Figure 5F:
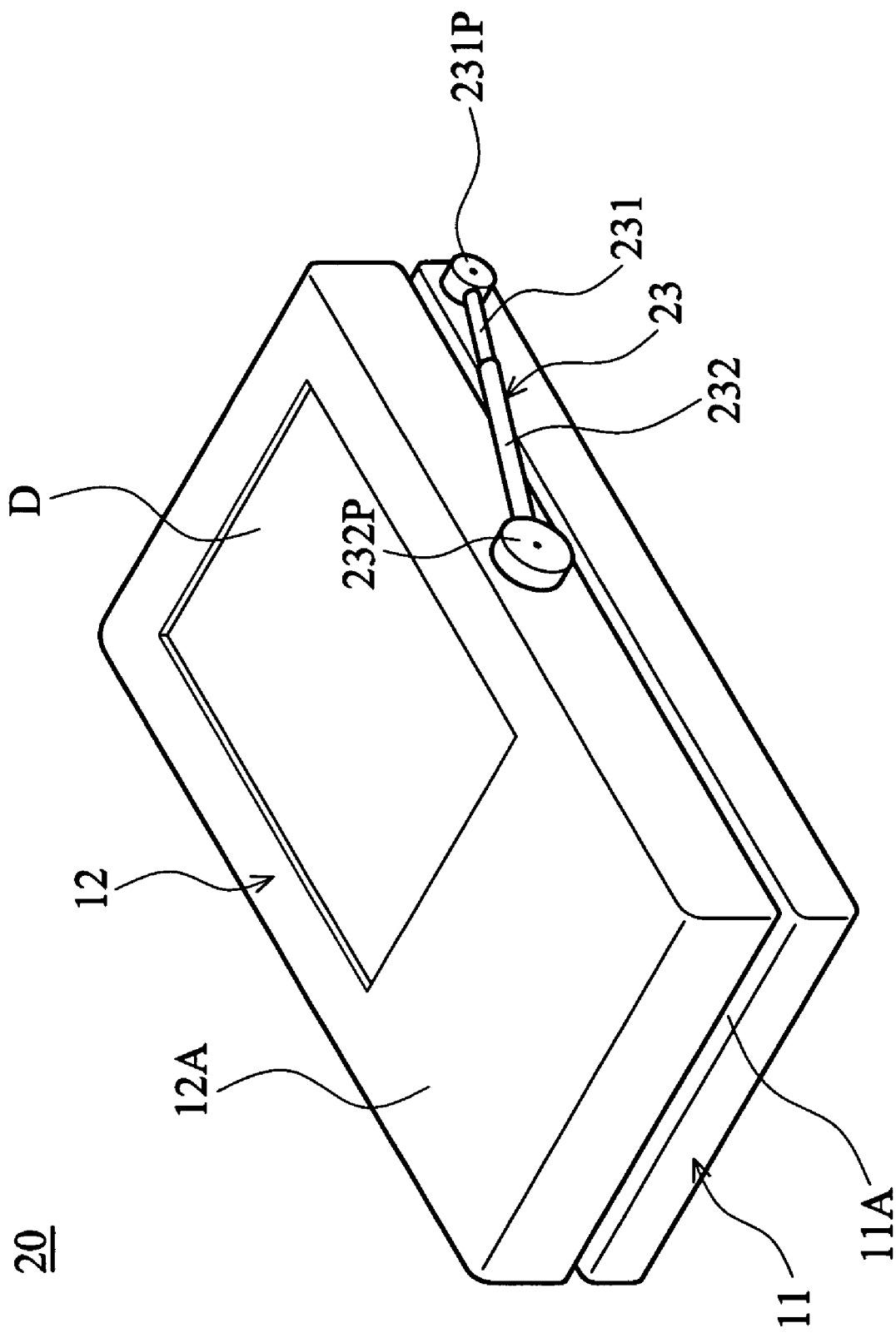

When opening the portable electronic device 10, 20, 30, the body 12 and the base 11 can also be oriented at a certain angle (as shown in FIGS. 3D, 5D and 7D), exposing the display D, allowing operation of the portable electronic device 10, 20, 30 by the keyboard K.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
    a base;
    a body having a first surface and a second surface; and
    a connecting mechanism, rotatably connected to the base and the body, wherein the connecting mechanism is telescopic and comprises:
        an elastic element, providing elasticity to the connecting mechanism;
        a pair of first connectors pivoted on the body;
        an axle connecting the first connectors; and
        a fixing member fixing the axle to the base in a rotatable manner;
    wherein the connecting mechanism rotates relative to the base and the body, allowing the base to face the first surface or the second surface of the body.

2. The portable electronic device as claimed in claim 1, wherein each first connector comprises a first connecting portion and a second connecting portion, and a notch is formed between the first and second connecting portions with the elastic element being disposed therein.

3. The portable electronic device as claimed in claim 2, wherein the elastic element connects the first connecting portion and the second connecting portion.

4. The portable electronic device as claimed in claim 2, wherein the first connecting portion rotatably connects to the base by the axle, and the second connecting portion. rotatably connects to the body.

5. The portable electronic device as claimed in claim 1, wherein the connecting mechanism further comprises a pair of second connectors, fixed to the body and connected with the first connectors respectively in a rotatable manner.

6. The portable electronic device as claimed in claim 1, wherein the connecting mechanism comprises a first connector pivoted on the base, and a second connector fixed to the body and pivoted on the first connector.

7. A portable electronic device, comprising:
    a base;
    a body having a first surface and a second surface; and
    a connecting mechanism rotatably connected to the base and the body;
    wherein the connecting mechanism rotates relative to the base and the body, allowing the base to face the first surface or the second surface of the body,
    wherein the body comprises a protrusion, the connecting mechanism comprises an opening, and the protrusion moves and rotates in the opening between a first area and a second area thereof, and
    wherein the portable electronic device further comprises an elastic element disposed on the periphery of the opening and abutted the protrusion.

8. The portable electronic device as claimed in claim 7, wherein the connecting mechanism comprises a first end pivoting on the base, allowing the base to rotate relative to the connecting mechanism.

9. The portable electronic device as claimed-in claim 7, wherein when the protrusion is in the first area of the opening, a first distance is defined between the protrusion and the first end, and when the protrusion is in the second area of the opening, a second distance is defined between the protrusion and the first end, exceeding the first distance.

* * * * *